United States Patent
Takahashi et al.

(10) Patent No.: US 10,256,904 B2
(45) Date of Patent: *Apr. 9, 2019

(54) FREE SPACE OPTICAL RECEIVER AND FREE SPACE OPTICAL RECEIVING METHOD

(71) Applicant: NEC Corporation, Tokyo (JP)

(72) Inventors: Seigo Takahashi, Tokyo (JP); Toshiharu Ito, Tokyo (JP); Kohei Hosokawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/327,862

(22) PCT Filed: Jul. 17, 2015

(86) PCT No.: PCT/JP2015/003609
§ 371 (c)(1),
(2) Date: Jan. 20, 2017

(87) PCT Pub. No.: WO2016/013188
PCT Pub. Date: Jan. 28, 2016

(65) Prior Publication Data
US 2017/0207850 A1 Jul. 20, 2017

(30) Foreign Application Priority Data

Jul. 22, 2014 (JP) ................................. 2014-148668

(51) Int. Cl.
*H04B 10/112* (2013.01)
*H04B 10/60* (2013.01)

(52) U.S. Cl.
CPC ........... *H04B 10/112* (2013.01); *H04B 10/60* (2013.01)

(58) Field of Classification Search
CPC ..................................................... H04B 10/60
See application file for complete search history.

(56) References Cited

U.S. PATENT DOCUMENTS 6,107,617 A * 8/2000 Love .................... G01J 9/00
250/201.9
6,792,185 B1 * 9/2004 Ahrens .............. H04B 10/1121
356/400

(Continued)

FOREIGN PATENT DOCUMENTS

JP 2001-298422 A 10/2001
JP 2012-160782 A 8/2012

(Continued)

OTHER PUBLICATIONS

International Search Report corresponding to PCT/JP2015/003609 dated Aug. 11, 2015 (5 total pages)

(Continued)

*Primary Examiner* — Mina M Shalaby
(74) *Attorney, Agent, or Firm* — Wilmer Cutler Pickering Hale and Dorr LLP

(57) ABSTRACT

The circuit size of a signal processing circuit increases in a free space optical receiver, which increases in cost, because the signal processing becomes complex attempting to improve the coupling efficiency between received light and a fiber; therefore, a free space optical receiver according to an exemplary aspect of the present invention includes a light collecting means for collecting laser light having propagated through a free space transmission path; a multi-mode transmission medium for receiving input of the laser light and outputting multi-mode light; a multi-mode signal processing means for outputting a plurality of received electrical signals based on part of the multi-mode light; a monitor means for monitoring signal information based on the multi-mode light; a control means for controlling an operation of the (Continued)

multi-mode signal processing means based on the signal information; and a signal processing means for performing signal processing on the plurality of received electrical signals and outputting an output signal synthesized from the plurality of received electrical signals.

12 Claims, 21 Drawing Sheets

(56) References Cited

U.S. PATENT DOCUMENTS

| | | | | |
|---|---|---|---|---|
| 7,197,248 | B1* | 3/2007 | Vorontsov | H04B 10/1127 398/119 |
| 9,479,285 | B2* | 10/2016 | Djordjevic | H04J 14/04 |
| 9,559,782 | B2* | 1/2017 | Koebele | H04B 10/2581 |
| 9,712,242 | B2* | 7/2017 | Rapp | H04B 10/27 |
| 2002/0196506 | A1* | 12/2002 | Graves | H04B 10/1125 398/126 |
| 2003/0001073 | A1* | 1/2003 | Presby | H04B 10/1121 250/201.9 |
| 2003/0062468 | A1* | 4/2003 | Byren | F41H 13/0043 250/216 |
| 2005/0045801 | A1* | 3/2005 | Smith | G01J 9/00 250/201.9 |
| 2005/0196170 | A1* | 9/2005 | Winsor | H04B 10/1121 398/118 |
| 2006/0024061 | A1* | 2/2006 | Wirth | H04B 10/1125 398/129 |
| 2007/0229993 | A1* | 10/2007 | Hemmati | G02B 23/06 359/846 |
| 2008/0267559 | A1* | 10/2008 | De Barros | G02B 6/02023 385/28 |
| 2010/0329693 | A1* | 12/2010 | Chen | H04B 10/85 398/147 |
| 2012/0008961 | A1* | 1/2012 | Chen | H04B 10/1121 398/119 |
| 2012/0177065 | A1* | 7/2012 | Winzer | H04B 10/2581 370/480 |
| 2012/0224861 | A1* | 9/2012 | Winzer | G02B 6/14 398/143 |
| 2013/0148963 | A1* | 6/2013 | Cvijetic | H04J 14/04 398/45 |
| 2014/0126902 | A1* | 5/2014 | Swanson | H04J 14/00 398/43 |
| 2014/0199066 | A1* | 7/2014 | Martelli | H04B 10/2581 398/44 |
| 2014/0270565 | A1* | 9/2014 | Poyneer | G06T 5/003 382/260 |
| 2015/0229438 | A1* | 8/2015 | Le Taillandier De Gabory | H04B 10/2581 398/182 |
| 2017/0070289 | A1* | 3/2017 | Takahashi | H04B 10/1121 |
| 2017/0264365 | A1* | 9/2017 | Takahashi | H04B 10/118 |

FOREIGN PATENT DOCUMENTS

| JP | 2013-535871 A | 9/2013 |
|---|---|---|
| WO | WO-2014-086393 A1 | 6/2014 |

OTHER PUBLICATIONS

Written Opinion corresponding to PCT/JP2015/003609 dated Aug. 11, 2015 (4 total pages).

\* cited by examiner

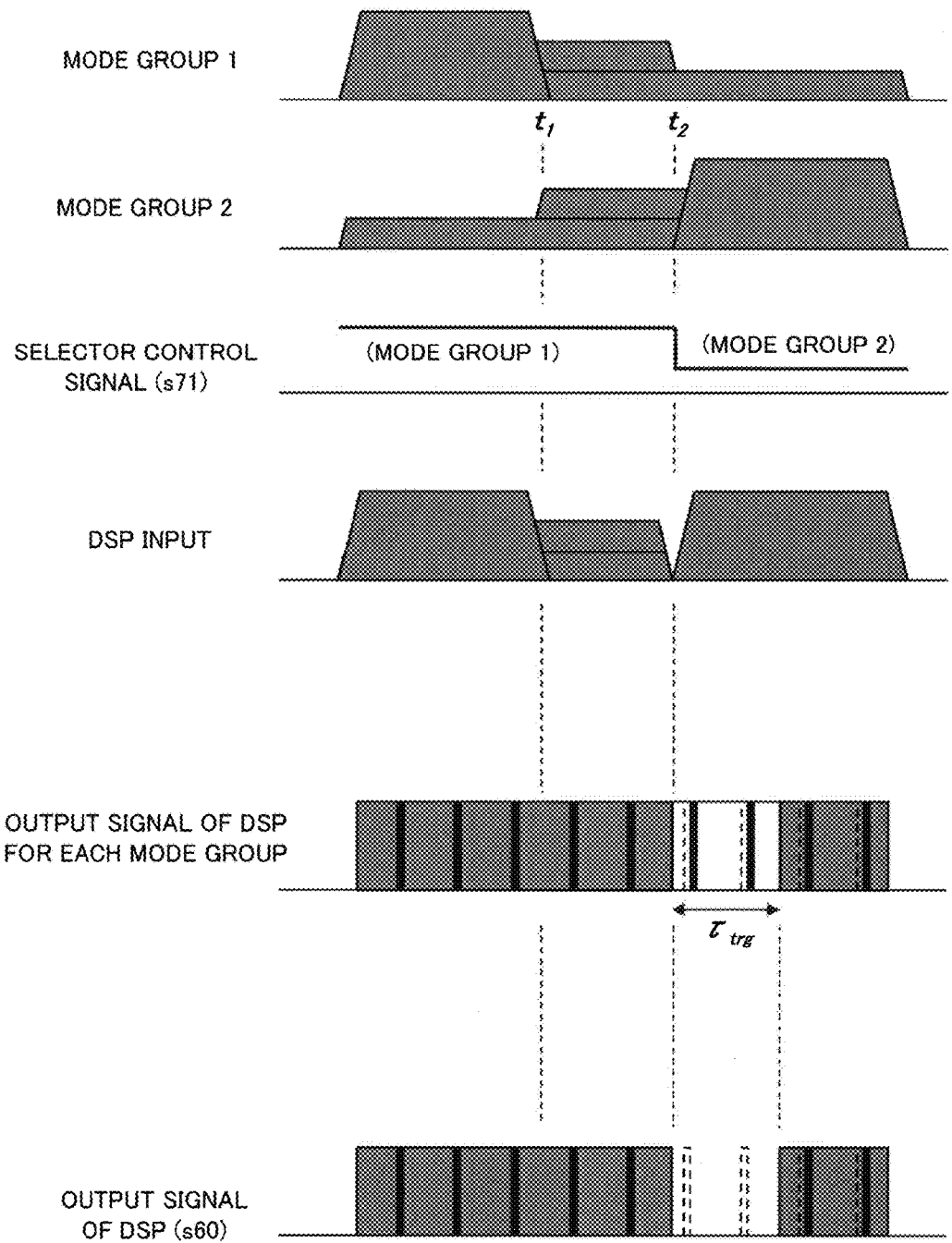

FREE SPACE OPTICAL RECEIVER AND FREE SPACE OPTICAL RECEIVING METHOD

CROSS REFERENCE TO RELATED APPLICATIONS

This application is a national stage application of International Application No. PCT/JP2015/003609 entitled "FREE SPACE OPTICAL RECEIVER AND FREE SPACE OPTICAL RECEIVING METHOD", filed on Jul. 17, 2015, which claims the benefit of the priority of Japanese Patent Application No. 2014-148668, filed on Jul. 22, 2014, the disclosures of each of which are hereby incorporated by reference in their entirety.

TECHNICAL FIELD

The present invention relates to free space optical receivers and free space optical receiving methods, in particular, to a free space optical receiver and a free space optical receiving method to perform optical communication using a laser light beam propagating through a free space.

BACKGROUND ART

In recent years, by the development of remote sensing technologies, observational instruments mounted in aircraft and artificial satellites have grown in performance, and the amount of information transmitted from the air to the ground is increasing. In order to efficiently transmit, to the ground, data to be generated in observation instruments having more improved performance in the future, a free space optics (FSO) system that uses an optical frequency band, by which a wider bandwidth can be expected more considerably than by microwaves, has been studied.

In the free space optics (FSO) system, a highly sensitive receiver is required in order to achieve an ultra-long distance transmission from an artificial satellite to the ground. In order to achieve a large-capacity free space optics (FSO) system, it is necessary to employ a high-speed technology for a transmission rate and a wavelength multiplexing technology. In this case, it is efficient to use a common technology with an optical fiber communication technology, that is, to apply an optical transmitting and receiving technology using a single mode fiber (SMF). The reason is that it is possible to use a direct optical amplification technology with low noise and high gain, a highly sensitive digital coherent receiving technology, a high bit rate transmitting and receiving technology, a dense wavelength division multiplexing (DWDM) technology and the like, for example.

An example of a free space optical communication device using such an optical fiber communication technology is described in Patent Literature 1.

In the free space optics (FSO) technology, it is general to make a modulated laser beam with a narrow beam to propagate through the air. On the receiving side, light beams are collected by an optical antenna and propagate through a short-range fiber, and then signal reception is performed. For the purpose of a large capacity, in Patent Literature 1, an optical transmitting and receiving technology using a transmitter including a coherent light source such as semiconductor laser and a single-mode fiber (SMF) is employed.

In a free space optics (FSO) receiver, a wave-front distortion of laser light due to signal propagation through the air near the ground becomes a problem as described below. A beam spot is formed on a focal plane in a collecting unit of the free space optics (FSO) receiver, and a speckle pattern arises on the beam spot due to an atmospheric disturbance. By the occurrence of the speckle pattern, the beam spot diffuses or moves (scintillation) against an ideal focal plane.

In the free space optics (FSO) receiver, optical coupling with a single mode fiber (SMF) is required as a bit rate of a signal increases. However, the above-described phenomenon of beam spot variation becomes a serious problem because it brings deterioration of the coupling efficiency (fade). The reason is that even a slight fluctuation of a beam spot causes a large fade to arise in the single mode fiber (SMF) having a small core diameter; consequently, the loss of received data arises. Therefore, in order to achieve a high capacity free space optics (FSO) system, it is necessary to suppress the fade due to scintillation with increase in a transmission rate.

In order to prevent the deterioration of the coupling efficiency (fade) with the above-described single mode fiber (SMF), the FSO receiver described in Patent Literature 1 is configured to use a single fiber tapered from a large core to a small core or a fiber bundle. Specifically, the FSO receiver described in Patent Literature 1 includes a telescopic collection system, a wavelength demultiplexer, photodetectors, analog-to-digital converters, and a digital signal processor. The FSO receiver has a configuration in which the light is collected from the demultiplexer into a plurality of individual fiber end faces and a tapered fiber bundle or a tapered single fiber concentrates the light into a single output fiber for input to the photodetector.

By this means, a relatively large optical aperture is provided for collecting the optical signal. Thus, there are known a tapered fiber that gradually becomes thinner and employs an adiabatic taper to couple efficiently the collected light into a single-mode output fiber. It is said that one benefit of the large aperture that is afforded by the above-described technique is greater tolerance to beam wander which tends to degrade the performance of the communication system.

Patent Literature 1 discloses a multi-mode fiber bundle obtained by fusing single-mode fibers together. An FSO receiver is disclosed that is configured to collect light on a large aperture surface of the fiber bundle using a collective lens.

CITATION LIST

Patent Literature

[PTL 1] Japanese Unexamined Patent Application Publication (Translation of PCT Application) No. 2013-535871

SUMMARY OF INVENTION

Technical Problem

It is difficult in the above-mentioned FSO receiver described in Patent Literature 1 to couple efficiently the light to a single-mode fiber because the fiber bundle has a larger proportion of a cladding area with respect to a core area. In cases where a tapered fiber has a single core, if the periphery of a large core is illuminated with coherent signal light, high-order modes are excited in a fiber with a large core region. At this time, the high-order modes that cannot propagate through a following single mode fiber (SMF) become a radiation loss in the adiabatic taper. Therefore, it is difficult in the FSO receiver described in Patent Literature 1 to couple efficiently the light with a fiber.

On the other hand, it is possible to prevent the deterioration of the fiber coupling efficiency due to the scintillation in the multi-mode fiber (MMF) itself described in Patent Literature 1 because its core area is sufficiently large. A configuration can be employed in which to separate all intrinsic propagation modes capable of propagating through the multi-mode fiber (MMF), couple individual optical signals of each separated mode with a single-mode fiber (SMF), and perform a photoelectric conversion by an optical receiver. At this time, received signals are resynthesized from the photoelectric-converted signals of all modes by a signal processing circuit (Digital Signal Processor: DSP). The signal processing circuit (DSP) performs a MIMO (Multiple Input Multiple Output) process or a SIMO (Single Input Multiple Output) process.

In the above-mentioned configuration, using the multi-mode fiber (MMF) having a sufficiently large core diameter makes it possible to receive an optical signal illuminating a core without loss principally, receive a high speed signal by coupling it to the SMF, and to regenerate a received signal stably by the resynthesizing in the signal processing circuit (DSP).

Meanwhile, various modes are excited in the multi-mode fiber (MMF) depending on the in-plane positions of the core that is illuminated with a light collection spot. In order to maintain good fiber coupling efficiency for strong scintillation, it is necessary to sufficiently increase the core diameter of the multi-mode fiber (MMF). On the other hand, the number of intrinsic modes m that can propagate through the multi-mode fiber (MMF) is positively correlated with approximately the square of the core diameter. Therefore, if a multi-mode fiber (MMF) having a large core diameter, by which sufficiently high coupling efficiency is obtained, is used, the number of modes m to be excited in the multi-mode fiber (MMF) significantly increases. Consequently, in order to achieve stable free space optics (FSO) receiving characteristics for strong scintillation, an FSO receiver needs to perform a MIMO process on many mode signals using a multi-mode fiber (MMF) having a large core diameter.

However, a circuit size necessary for the MIMO process is proportional to the square of the number of signals; therefore, there is the problem that a circuit size of a signal processing circuit (DSP) increases at an accelerated rate as the number of input signals increases with the core diameter of a multi-mode fiber (MMF) increasing.

As described above, there has been the problem that the circuit size of a signal processing circuit increases in a free space optical receiver, which increases in cost, because the signal processing becomes complex attempting to improve the coupling efficiency between received light and a fiber.

The object of the present invention is to provide a free space optical receiver and a free space optical receiving method that solve the problem that the circuit size of a signal processing circuit increases in a free space optical receiver, which increases in cost, because the signal processing becomes complex attempting to improve the coupling efficiency between received light and a fiber.

Solution to Problem

A free space optical receiver according to an exemplary aspect of the present invention includes a light collecting means for collecting laser light having propagated through a free space transmission path; a multi-mode transmission medium for receiving input of the laser light and outputting multi-mode light; a multi-mode signal processing means for outputting a plurality of received electrical signals based on part of the multi-mode light; a monitor means for monitoring signal information based on the multi-mode light; a control means for controlling an operation of the multi-mode signal processing means based on the signal information; and a signal processing means for performing signal processing on the plurality of received electrical signals and outputting an output signal synthesized from the plurality of received electrical signals.

A free space optical receiving method according to an exemplary aspect of the present invention includes collecting laser light having propagated through a free space transmission path; converting collected laser light into multi-mode light; monitoring signal information based on the multi-mode light; generating a plurality of received electrical signals based on part of the multi-mode light, based on the signal information; and synthesizing an output signal from the plurality of received electrical signals.

Advantageous Effects of Invention

According to the free space optical receiver and the free space optical receiving method of the present invention, it is possible to suppress an increase in a circuit size of a signal processing circuit and improve the coupling efficiency between received light and a fiber.

BRIEF DESCRIPTION OF DRAWINGS

FIG. 6A is a diagram to describe the operation of a free space optical receiver in accordance with the third example embodiment of the present invention and a schematic diagram illustrating a time variation of an input/output signal if a single signal processing circuit (DSP) is used.

DESCRIPTION OF EMBODIMENTS

Hereinafter, with reference to the drawings, example embodiments of the present invention will be described.

A First Example Embodiment

Figure 1:
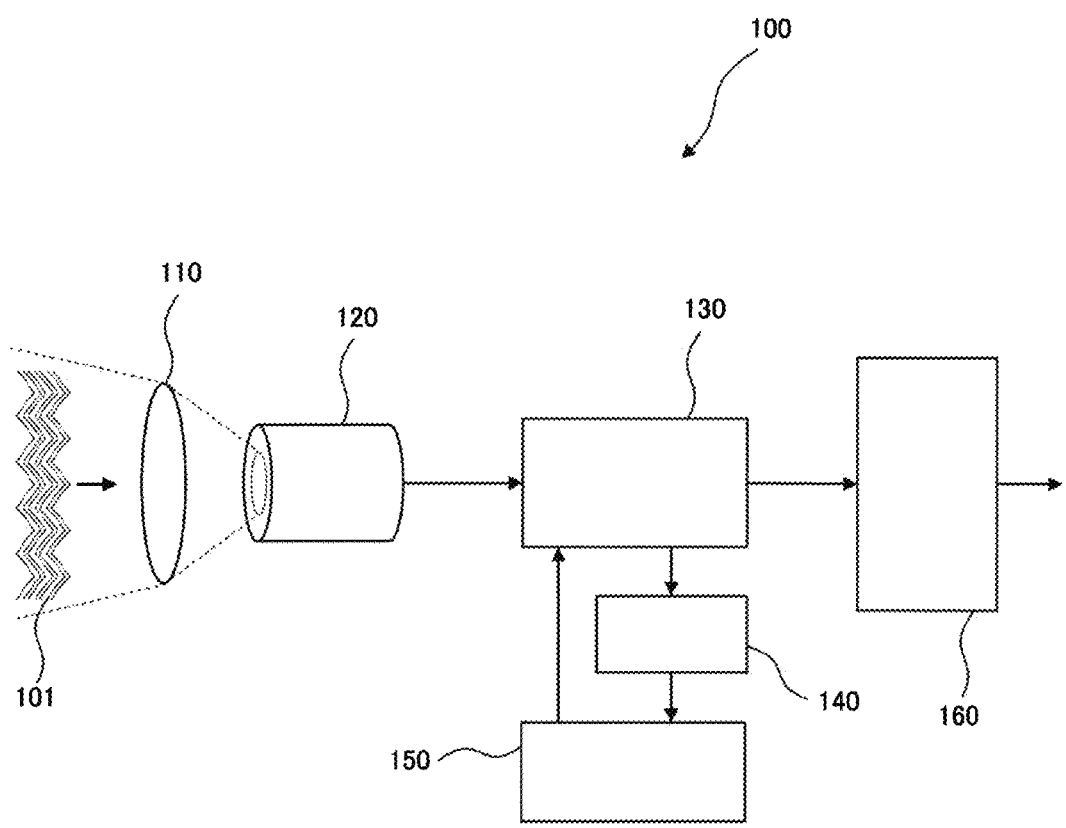
FIG. 1 is a block diagram illustrating a configuration of a free space optical receiver in accordance with a first example embodiment of the present invention.

FIG. 1 is a block diagram illustrating a configuration of a free space optical receiver 100 in accordance with a first example embodiment of the present invention. The free space optical receiver 100 includes a light collecting unit 110, a multi-mode transmission medium 120, a multi-mode signal processing unit 130, a monitor unit 140, a control unit 150, and a signal processing unit 160.

The light collecting unit 110 collects laser light 101 having propagated through a free space transmission path. The multi-mode transmission medium 120 receives input of the laser light 101 and outputs multi-mode light. The multi-mode signal processing unit 130 outputs a plurality of received electrical signals based on part of the multi-mode light. The monitor unit 140 monitors signal information based on the multi-mode light. The control unit 150 controls the operation of the multi-mode signal processing unit 130 based on the signal information. The signal processing unit 160 performs signal processing on the plurality of received electrical signals and outputs an output signal synthesized from the plurality of received electrical signals.

As described above, the free space optical receiver according to the present example embodiment is configured to introduce the laser light having propagated through the free space transmission path into the multi-mode transmission medium. This makes it possible to improve the coupling efficiency between received light and a fiber. The free space optical receiver is configured to generate the plurality of received electrical signals based on part of the multi-mode light, perform the signal processing on only these received electrical signals, and synthesize the received electrical signals. This makes it possible to reduce the circuit size of the signal processing circuit.

Next, a free space optical receiving method according to the present example embodiment will be described.

In the free space optical receiving method of the present example embodiment, first, laser light having propagated through a free space transmission path is collected, and the collected laser light is converted into multi-mode light. Signal information based on the multi-mode light is monitored, and a plurality of received electrical signals based on part of the multi-mode light are generated based on the signal information. Finally, the plurality of received electrical signals are synthesized.

According to the free space optical receiving method in accordance with the present example embodiment, the above-described configuration makes it possible to suppress an increase in a circuit size of a signal processing circuit and improve the coupling efficiency between received light and a fiber.

A Second Example Embodiment

Figure 2:
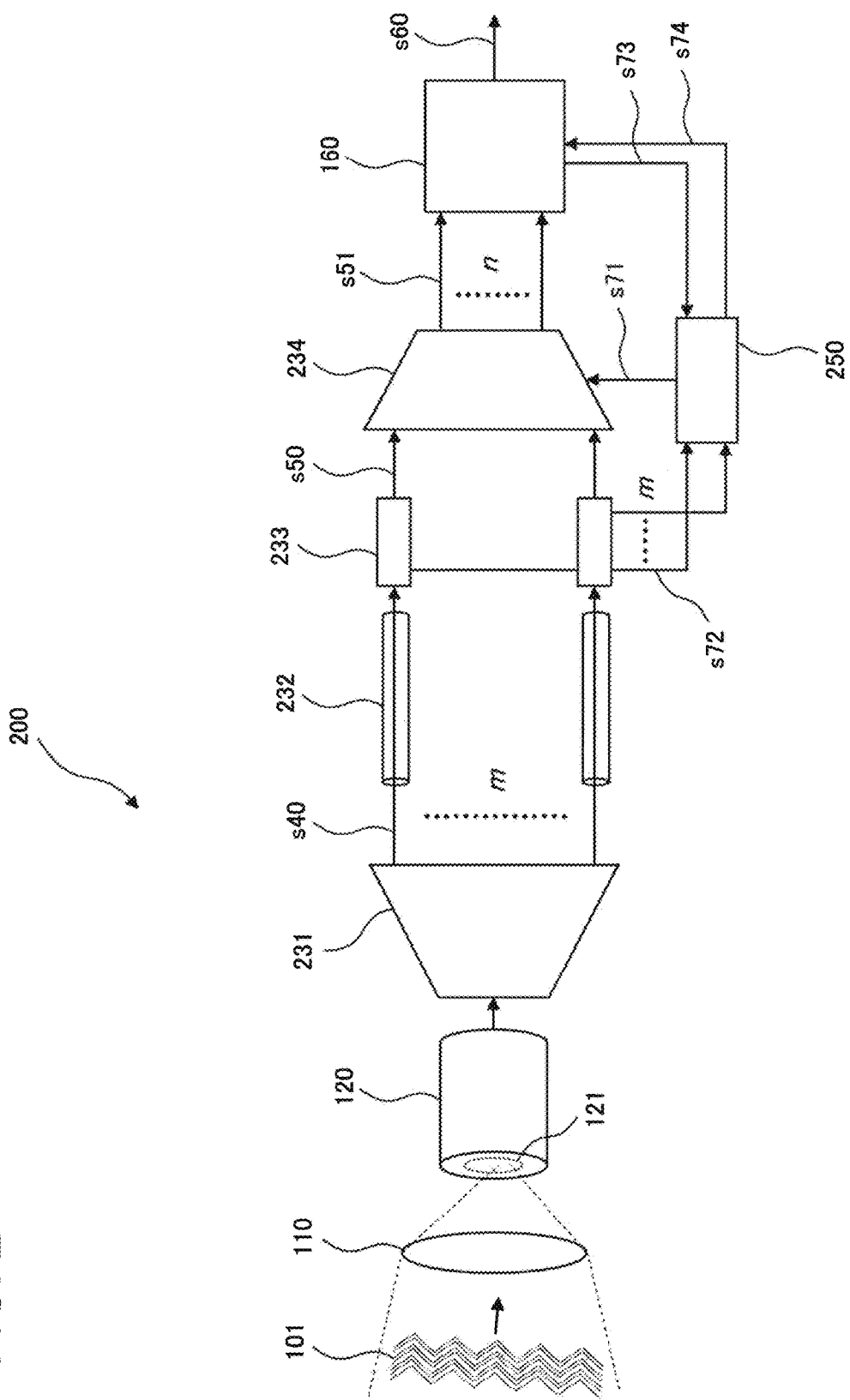
FIG. 2 is a block diagram illustrating a configuration of a free space optical receiver in accordance with a second example embodiment of the present invention.

Next, a second example embodiment of the present invention will be described. FIG. 2 is a block diagram illustrating a configuration of a free space optical receiver 200 in accordance with the second example embodiment of the present invention.

The free space optical receiver 200 includes the light collecting unit 110, the multi-mode transmission medium 120, a mode separating unit 231, a plurality of single-mode transmission media 232, a plurality of optical receivers 233, a signal selecting unit 234, a selection control unit 250 as a control unit, and the signal processing unit 160. The mode separating unit 231, the plurality of single-mode transmission media 232, the plurality of optical receivers 233, and the signal selecting unit 234 compose a multi-mode signal processing unit.

The light collecting unit 110 is composed of a light collection optical system including an optical antenna and focuses the laser light 101 having wave-front distortion due to the free space propagation on a core 121 of the multi-mode transmission medium 120. The core 121 has a sufficient area for scintillation, which makes it possible to achieve high fiber coupling efficiency. The multi-mode transmission medium 120 is typically a multi-mode fiber (MMF) that is an optical waveguide with an optical fiber shaped. However, the multi-mode transmission medium 120 is not limited to this, and a planar lightwave circuit (PLC), a three-dimensional optical waveguide (for example, a 3d-Photonic Lantern: PL) and the like may be used.

The laser light (signal light) focused on the core 121 of the multi-mode transmission medium 120 moves in the plane of the core 121 due to scintillation, and thus a propagation mode excited in the multi-mode transmission medium 120 also varies.

At this time, the mode separating unit 231 separates the multi-mode light beam into a plurality of single-mode light beams, and these single-mode light beams propagate through the plurality of single-mode transmission media 232 respectively. Specifically, the mode separating unit 231 separates all of m modes that can propagate through the multi-mode transmission medium 120 into single-mode optical signals s40, and outputs the signal mode optical signals coupling them to the m single-mode transmission media 232. Each of the single-mode transmission media 232 is typically a single-mode fiber (SMF). The mode separating unit 231 can be configured by applying a mode multiple separation technology using Photonic Lantern and the like, for example. As described above, the mode separation and coupling to the single-mode fiber (SMF) make it possible to apply a group of optical fiber transmission technologies based on the single-mode fiber (SMF). This makes it possible to achieve high capacity and long distance transmission of free space optics (FSO).

The optical receivers 233 respectively receive the plurality of single-mode light beams through the plurality of single-mode transmission media 232 and demodulate the plurality of single-mode light beams. That is to say, all of the mode-separated optical signals s40 are photoelectric-converted by the m units of optical receivers 233. The optical receivers 233 can be can be configured by employing coherent optical receivers or a digital coherent technology.

The signal selecting unit 234 is disposed in at least one of a stage preceding and a stage following the plurality of optical receivers 233, and selects and outputs a part of a plurality of input signals. FIG. 2 illustrates a case in which the signal selecting unit 234 is disposed in a stage following the optical receivers 233. In this case, the signal selecting unit 234 selects n received signals s50 from among m received signals s50 that have been photoelectric-converted in the optical receivers 233. The "m" and "n" represent positive integers and have a relation of $m \geq n \geq 1$. The signal selecting unit 234 can be configured using a matrix switch by means of an electronic circuit.

The n received electrical signals s51 selected by the signal selecting unit 234 are inputted into the signal processing unit 160. The signal processing unit 160 performs signal processing on the whole or a part of the plurality of received electrical signals s51 and outputs an output signal s60 that is resynthesized from the received electrical signals. The signal processing unit 160 is typically configured by a signal processing circuit (DSP).

The selection control unit 250 controls the operation of the signal selecting unit 234 based on at least one of the signal information on the plurality of single-mode light beams and the quality information on the received electrical signals calculated by the signal processing unit 160. The operations of the signal selecting unit 234 and the selection control unit 250 will be described below in detail.

The signal selecting unit 234 operates as follows depending on a control signal s71 from the selection control unit 250. That is to say, the signal selecting unit 234 outputs n or less received electrical signals s51 obtained by combining the input m received signals s50 arbitrarily. At this time, the signal selecting unit 234 selects signals with good signal quality from among the received signals s50 and outputs the selected signals as the received electrical signals s51. The signal quality can be obtained from the signal information on the single-mode optical signals s40, typically, the signal intensity. In this case, the above-mentioned signal quality can be determined by monitoring respective intensities of the mode-separated received signals s50, for example. An intensity signal s72 can be obtained by using an optical monitoring function embedded in the optical receivers 233 as a monitor unit, for example. The signal information may be obtained from the amplitudes of the photoelectric-converted received signals s50.

The above-mentioned signals with good signal quality can include signals with a high S/N ratio (signal-noise ratio) or signals with small mode crosstalk among signals with a sufficient amplitude in optical receiving. At this time, the S/N ratio and the crosstalk amount may be evaluated using an amplitude distribution of the received electrical signals s51.

The signal processing unit 160 may detect the quality information on the received electrical signals s51 by an internal digital signal processing technology and supply the quality information to the selection control unit 250 as quality information s73. As the quality information on the received electrical signals s51 that can be detected in the signal processing unit 160, values indicating S/N ratios of signals such as Q values of the received electrical signals s51 can be used, for example. The quality information is not limited to those, and the information on phases and polarized waves may be used.

In addition, the selection control unit 250 may supply selector switching information s74 to the signal processing unit 160, by which the received mode selection and the resynthesizing process of received electrical signals may be made to cooperate with each other. An increase or decrease in the number of the received electrical signals s51 to be used for the resynthesis affects the quality of the output signal s60 to be reproduced. Particularly, blocking of the received electrical signals s51 can cause a false operation in an error correction process due to a sudden decrease in information amount or cause a signal interruption of the reproduced output signal s60, and the like even though the blocked signal is just a part of the received electrical signals to be used for the resynthesizing process. In order to avoid an unstable operation as described above, it can be configured to notify the signal processing unit 160 in advance about a blocking of the received electrical signals s51 or additional information as the selector switching information s74. This makes it possible to perform a mask process of an internal error, the optimization of an error correction process, and the like in the signal processing unit 160.

Next, the operation of the selection control unit 250 will be described using FIG. 3.

Figure 3:
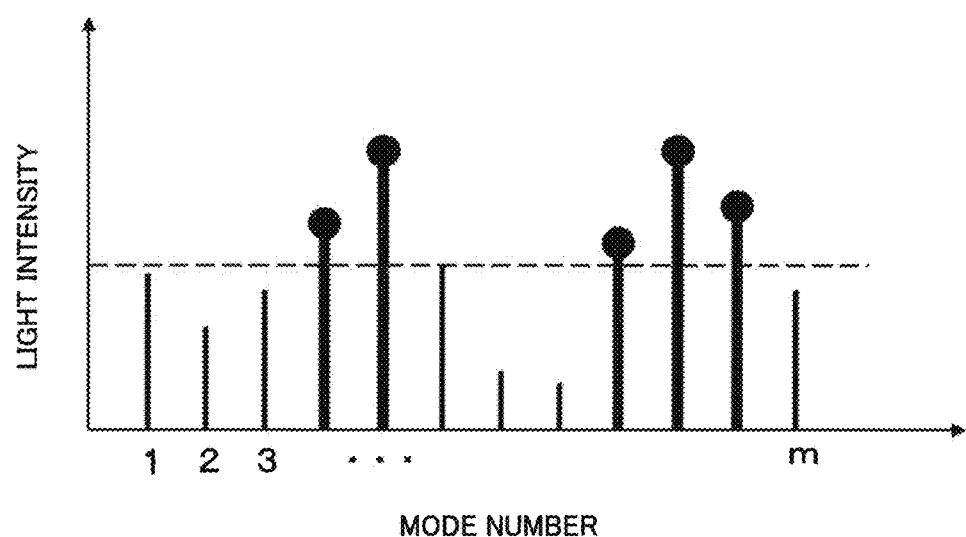
FIG. 3 is a schematic diagram illustrating a light intensity distribution of each propagation mode of signal light obtained by a monitor unit included in a free space optical receiver in accordance with the second example embodiment of the present invention.

FIG. 3 is a schematic diagram illustrating a light intensity distribution of each propagation mode of signal light obtained by the monitor unit embedded in the optical receiver 233. In the figure, a horizontal axis represents a notional mode number and denotes a higher-order mode as it goes from the origin. The vertical axis represents a light intensity. A dashed line shows a predetermined threshold value, and circles are added to optical signals of modes with the light intensity exceeding the threshold value.

The selection control unit 250 controls the signal selecting unit 234 so that the quality of the output signal s60 may become the best using the information that is obtained from a plurality of monitor signals. As the control at this time, it can be configured to select five modes with the circles added in FIG. 3, for example. It may be configured to select received signals with the predetermined number from among the received signals having the light intensity exceeding the predetermined threshold value illustrated in FIG. 3 according to a predetermined rule. As the rule at this time, it is possible to use a method for selecting signals with the light intensity in descending order or with the mode number in ascending order, a method for selecting signals with higher stability ranking by learning, and the like, for example. As the threshold value, it is possible to use a value obtained by adding a predetermined margin based on the minimum receiving sensitivity of the optical receivers 233, for example.

If a feedback-type is configured in which the quality information s73 is obtained from the signal processing unit 160, the selection control unit 250 can perform optimum control by using the intensity signal s72 and the quality information s73 together. In this case, the selection control unit 250 performs the following operations in addition to the above-mentioned operations. If a Q value is used as quality information of the signals obtained from the signal processing unit 160, for example, the intensity information on the received signals s40 is combined with the Q value. This enables the selection control unit 250 to exclude a signal deteriorated due to a crosstalk and a signal largely affected by modal dispersion, and select the received electrical signals s51 of the output signals of the signal selecting unit 234 from among the rest of the received signals s40. Specifically, for example, if a signal is used that has an apparent large intensity and has the Q value deteriorated due to a mode crosstalk, it is difficult to resynthesize received electrical signals successfully. In such a case, selecting a signal with a weak signal intensity and the larger Q value makes it possible to resynthesize received electrical signals successfully.

If phase information is used as the quality information of the signals obtained from the signal processing unit 160, for example, it is possible to detect signals having undergone a large modal dispersion. This is because a delay amount due to the modal dispersion is correlated with the slope of an incident wave-front with respect to a fiber end portion of the multi-mode transmission medium 120, that is, the size of wave-front distortion. This makes it possible to use the phase information for the decision to exclude a wave-front having a slope above a certain value using a predetermined threshold value.

If polarized wave information is used as the quality information of the signals obtained from the signal processing unit 160, it becomes possible to detect a mode variation. A propagation mode (linearly polarized mode: LP mode) of the multi-mode fiber (MMF) is a synthesis of a plurality of fundamental modes (FM). The reduction of a change in the polarized wave state to the fundamental mode FM makes it possible to detect a change in the mode state. Specifically, it becomes possible to detect signal quality degradation by performing an analysis and learning in advance and observing a mode variation.

The selection control unit 250 may be configured to use a correlation of the plurality of received signals s40. A temporal distribution of signal quality for each mode can be obtained by monitoring symbol error rates of a plurality of modes. Consequently, it becomes possible to control a mode selection so that data loss in a time direction may become smaller. Because a variation in the optical signal intensity due to scintillation differs between respective modes, it becomes possible to perform a control so as to minimize data loss in the output signal s60 resynthesized from the received electrical signals s51 by selecting a plurality of modes without correlation with each other or a mode having inverse characteristics.

The case has been described in the above-mentioned embodiment in which the signal selecting unit 234 is disposed in a stage following the optical receivers 233 as illustrated in FIG. 2. The present embodiment is not limited to this, and a configuration may be used in which the signal selecting unit 234 is disposed in a stage preceding the plurality of the optical receivers 233. The configuration of a free space optical receiver 201 in this case is illustrated in FIG. 4.

Figure 4:
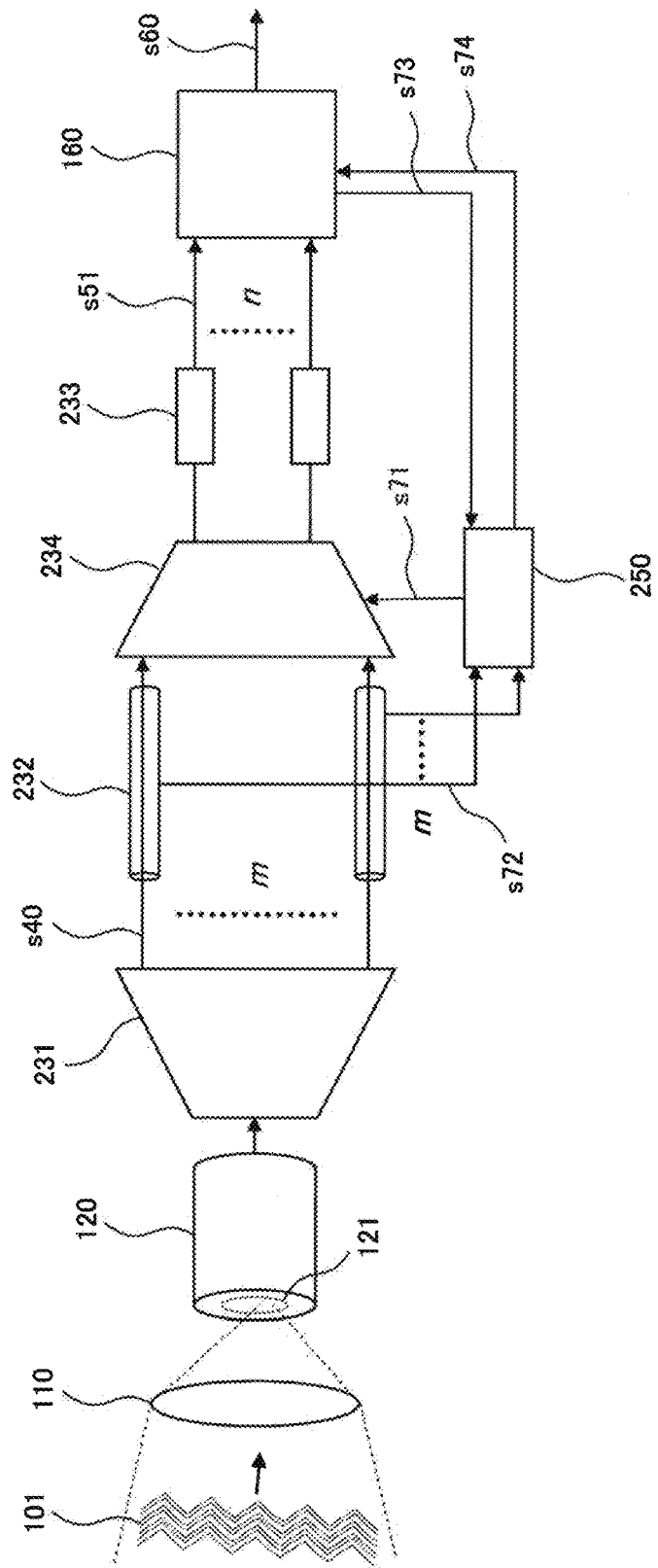
FIG. 4 is a block diagram illustrating another configuration of a free space optical receiver in accordance with the second example embodiment of the present invention.

As illustrated in FIG. 4, the signal selecting unit 234 is disposed between the mode separating unit 231 and the optical receivers 233. In this case, the monitor unit is configured to monitor optical power dividing an optical signal by a divider in the middle of a single-mode fiber (SMF) as the single-mode transmission media 232. The operations of the signal selecting unit 234 and the selection control unit 250 are similar to those of the free space optical receiver 200 illustrated in FIG. 2.

Since the configuration makes it possible to reduce the number of optical receivers 233, it is possible to reduce the cost and the power consumption of the entire free space optical receiver 201.

An optical matrix switch with the number of input signals equal to m and the number of output signals equal to n can be used as the signal selecting unit 234. It is preferable to employ an optical switch having high speed connection switching performance as the optical matrix switch. As a high speed optical switch, various types of optical switch elements can be employed such as a planar silica optical waveguide optical switch, an optical switch using a silicon photonics technology, an optical switch based on a lithium niobate waveguide, a PLZT (lead lanthanum zirconate titanate) optical switch, and a MEMS (micro electro mechanical systems) optical switch, for example.

As described above, according to the free space optical receivers 200 and 201 of the present example embodiment, it is possible to suppress an increase in a circuit size of a signal processing circuit and improve the coupling efficiency between received light and a fiber. This is because it is possible to reduce the circuit size of the signal processing circuit (DSP) by decreasing the number of input signals into the signal processing circuit (DSP). As a result, it is possible to achieve miniaturization and low cost of a free space optical receiver by which the influence of scintillation can be reduced and high capacity transmission can be performed.

As mentioned above, the free space optical receivers 200 and 201 according to the present example embodiment makes it possible to avoid deterioration of fiber coupling efficiency by using a multi-mode fiber (MMF) having a large core diameter as the multi-mode transmission medium 120. Although a high-order mode is excited in the multi-mode fiber (MMF) due to the occurrence of scintillation at this time, not all modes of the multi-mode fiber (MMF) are simultaneously excited. Therefore, the free space optical receivers are configured to select and supply only a signal having a large S/N ratio to the signal processing circuit (DSP) from among the modes excited in the multi-mode fiber (MMF). At this time, a stable receiving operation becomes possible by using a configuration including a control function of detecting modes excited at a response speed equal to or less than the time constant of scintillation and selecting modes variably. As a result, according to the free space optical receivers 200 and 201 of the present example embodiment, it is possible to achieve both of the stable receiving operation and the reduction of the circuit size of the signal processing circuit (DSP).

A Third Example Embodiment

Figure 5:
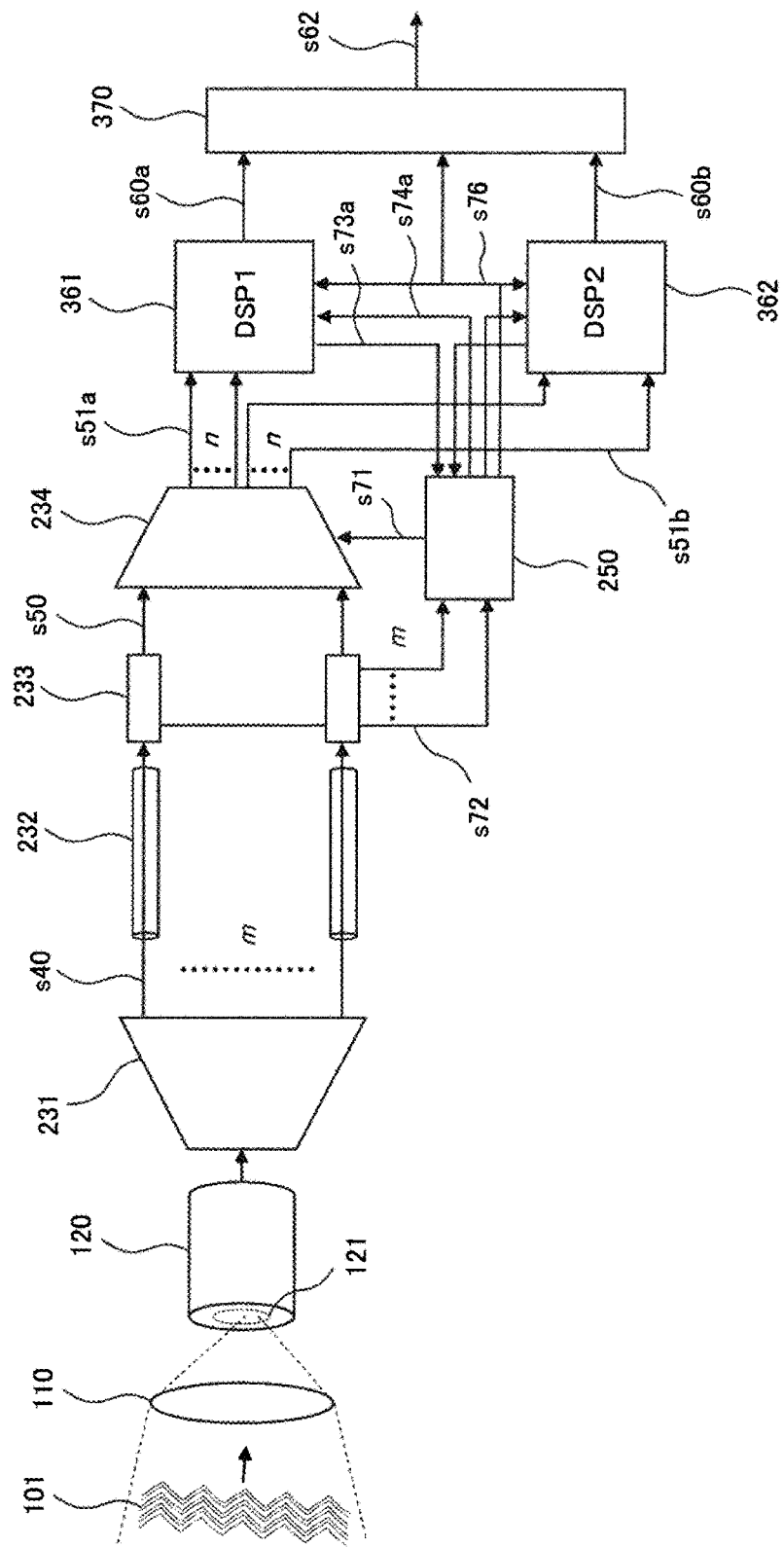
FIG. 5 is a block diagram illustrating a configuration of a free space optical receiver in accordance with a third example embodiment of the present invention.

Next, a third example embodiment of the present invention will be described. FIG. 5 illustrates a configuration of a free space optical receiver 300 in accordance with the third example embodiment of the present invention.

The free space optical receiver 300 according to the present example embodiment includes differs from the configuration of the free space optical receiver 200 according to the second example embodiment in including a plurality of signal processing circuits as a signal processing unit and a combining unit 370 that combines the outputs of the plurality of signal processing circuits and outputs an output signal s62. FIG. 5 illustrates a configuration including a first signal processing circuit 361 and a second signal processing circuit 362. The other configurations are similar to those of the free space optical receiver 200 according to the second example embodiment; accordingly, a detailed description thereof is omitted.

In this case, the signal selecting unit 234 is configured to have the same number of outputs as the sum of the number of input signals of the plurality of signal processing circuits 361 and 362. Specifically, in the case illustrated in FIG. 5, since each of the first signal processing circuit 361 and the second signal processing circuit 362 has n input signals, the signal selecting unit 234 is configured to output 2×n received electrical signals s51a and s51b. That is to say, the signal selecting unit 234 selects 2×n output signals with arbitrary combinations from among m input signals. The condition of the number of input and output signals in the signal selecting unit 234 is m≥n, but it is not necessary to satisfy the condition of m≥2n. Consequently, the signals respectively including the same signal selected from input signals may be output to the first signal processing circuit 361 and the second signal processing circuit 362. The signal selecting unit 234 can be configured using an electronic matrix switch, for example.

Each of the first signal processing circuit 361 and the second signal processing circuit 362 can set independent parameters in making a resynthesis of the received electrical signals. It is not necessary for the first signal processing circuit 361 and the second signal processing circuit 362 to exclusively operate. Consequently, resynthesizing processes of the received electrical signals may simultaneously be performed independently on the received electrical signals s51a and s51b that are inputted into each of them. Because the first signal processing circuit 361 and the second signal processing circuit 362 apparently operate depending on the selection control unit 250 with a mode intensity distribution varying, the first signal processing circuit 361 and the second signal processing circuit 362 may synchronously operate by receiving a control signal s76 from the selection control unit 250.

The combining unit 370 makes merge two signals s60a and s60b resynthesized in the first signal processing circuit 361 and the second signal processing circuit 362 respectively and outputs a single output signal s62. The combining unit 370 can be configured to include input buffer circuits for phase matching independent from each other at the input parts for two input signals s60a and s60b. The buffer capacity of the input buffer circuit is configured to be larger than a maximum value of delay amounts due to modal dispersion. It is possible to link a maximum value of mode delay amounts of a mode group to be selected with the buffer delay amounts depending on the switching operation of the signal selecting unit 234.

The combining unit 370 performs a process to synchronize the phases of input signals and make the two input signals s60a and s60b merge into the single output signal s62 according to a predetermined algorithm. Here, it is possible to use, as the algorithm for the merging process, a method of comparing error rates of the two input signals s60a and s60b with each other and selecting a signal having a favorable error rate, for example. Since the combining unit 370 operates apparently depending on the selection control unit 250 with a variation in the intensity distribution of the mode, the combining unit 370 may synchronously operate by receiving the control signal s76 from the selection control unit 250 as is the case with the first signal processing circuit 361 and the second signal processing circuit 362.

The variation in the number of received electrical signals inputted into the signal processing unit (DSP) can cause instability of a reproduced signal s60 even though it is a part of the ratio occupied in an entire signal used for the resynthesizing process. Accordingly, it can be configured to notify in advance the first signal processing circuit 361, the second signal processing circuit 362, and the combining unit 370 of the variation in the received electrical signals by switching information s74a and s74b from the signal selecting unit 234 and the control signal s76. This makes it possible to optimize the operation state of the signal processing circuit (DSP) and perform a mask process on signals degraded during an unstable period.

The above-mentioned configuration makes it possible to achieve a balance between the stable receiving in the free space optics (FSO) and the reduction in the circuit size of the signal processing unit (DSP), according to the free space optical receiver 300 of the present example embodiment. In addition, it becomes possible to prevent interruptions in the output signal by making the two signal processing circuits (DSPs) operate in a complementary style during a period when the resynthesizing process of the received electrical signals pauses due to a training operation of the signal processing unit (DSP). As mentioned above, the free space optical receiver 300 of the present example embodiment is configured to use two small-scale signal processing circuits (DSP) connected in parallel. This makes it possible to reduce a circuit size as compared with a configuration in which MIMO processes are performed in a lump using a single signal processing circuit (DSP).

Figure 6B:
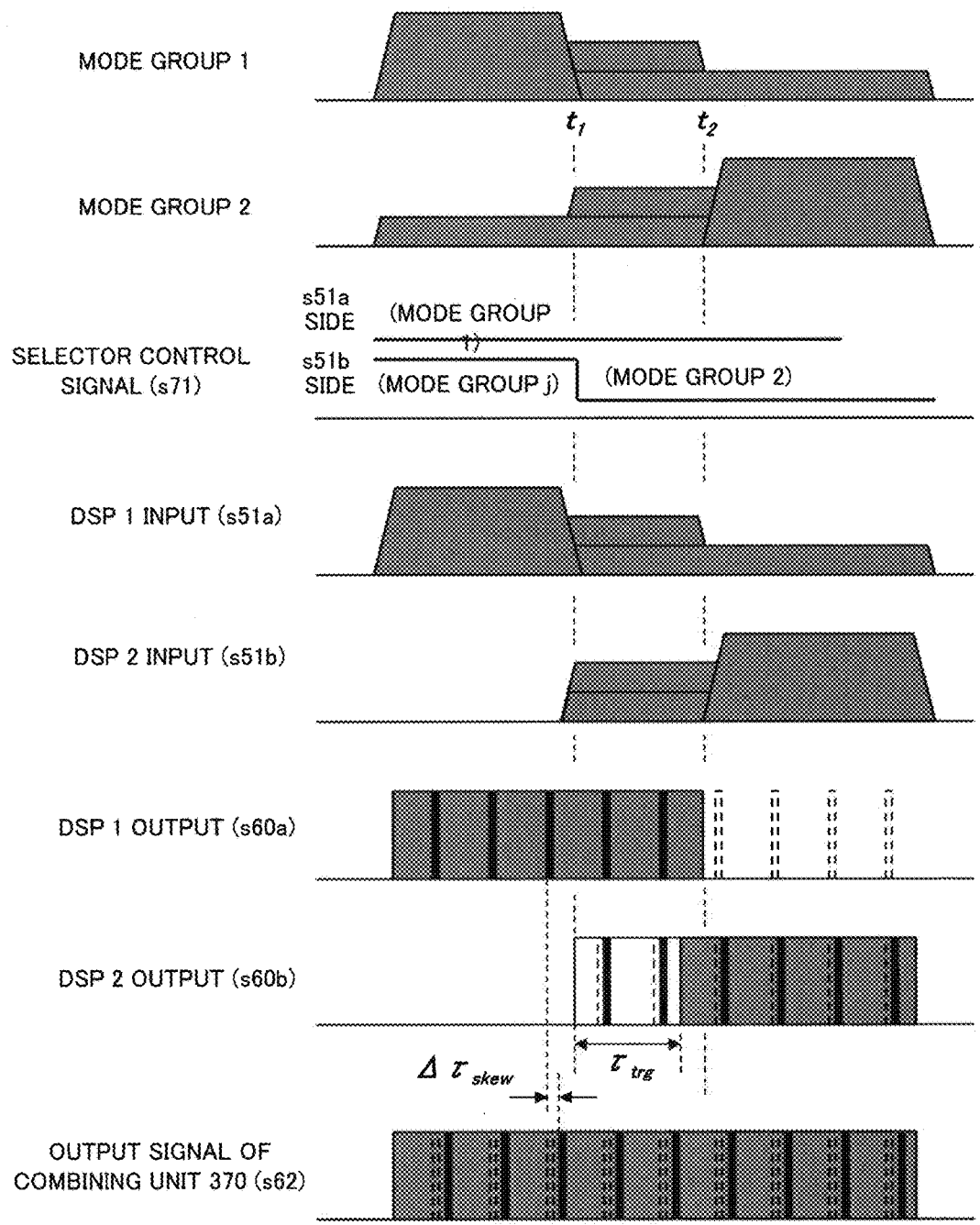
FIG. 6B is a diagram to describe the operation of a free space optical receiver in accordance with the third example embodiment of the present invention and a schematic diagram illustrating a time variation of an input/output signal if two signal processing circuits (DSP) are used.

Next, the operations of the first signal processing circuit 361, the second signal processing circuit 362, and the combining unit 370 will be described in detail. FIG. 6A and FIG. 6B are schematic diagrams schematically illustrating time variations in input and output signals of the signal processing circuits (DSP) 361 and 362 and the combining unit 370 with the variation in the mode intensity distribution of the signal light coupled to the multi-mode fiber (MMF). FIG. 6A illustrates a case using a single signal processing circuit (DSP), and FIG. 6B illustrates a case using the first signal processing circuit 361 and the second signal processing circuit 362 according to the present example embodiment.

With the movement of a focused spot on the end face of the multi-mode fiber (MMF), a mode excited in the multi-mode fiber (MMF) varies. It is assumed that the mode excited in the multi-mode fiber (MMF) is not single but a plurality of modes are simultaneously excited with an arbitrary intensity distribution, which are called a mode group. If it is assumed that the movement of the focused spot continuously varies with the motion of a phase of a wavefront, it is possible to suppose that the movement of the intensity distribution between two mode groups is also continuous. This is schematically expressed in FIG. 6A and FIG. 6B as a transition of the light intensity between time $t_1$ and time $t_2$ on the horizontal axis. That is to say, excited modes sequentially move from mode group 1 to mode group 2 from the time $t_1$ to time $t_2$.

First, a receiving operation sequence using the single signal processing circuit (DSP) will be described with reference to FIG. 6A. If the signal selecting unit 234 selects a signal to be supplied to the signal processing circuit (DSP), the received electrical signal s51 of the input signal into the signal processing circuit (DSP) is switched at the time (time $t_2$) when the modal distribution of the mode group 1 varies and the intensity decreases according to a switching of the control signal (a selector control signal) s71 of the signal selecting unit 234. The signal processing circuit (DSP) starts a predetermined training sequence for MIMO parameter by signal switching, and outputs a resynthesized signal from the mode group 2 after the completion of the training.

A time required for the training of the signal processing circuit (DSP) is represented by $\tau_{trg}$, and the output signal s60 output from the signal processing circuit (DSP) is interrupted by a time corresponding to $\tau_{trg}$. Since intrinsic modes propagating through the multi-mode fiber (MMF) generally differ from each other in group delay, there is a possibility that the phase of the output signal s60 varies with a switch of the mode group. The signal interruption and the phase variation as described above can become a factor in preventing stable signal reception in the free space optics (FSO) reception.

Next, a sequence of the receiving operation of the free space optical receiver 300 according to the present example embodiment will be described using FIG. 6B.

The movement of the modal distribution from the mode group 1 to the mode group 2 is the same as the case illustrated in FIG. 6A. It is assumed that the signal selecting unit 234 has two sets of output and selects and outputs the mode group 1 to the first signal processing circuit (DSP 1) and the mode group 2 to the second signal processing circuit (DSP 2).

Before the time $t_1$, the mode group 1 is resynthesized by the first signal processing circuit (DSP 1), whereas the second signal processing circuit (DSP 2) does not perform a signal resynthesis because light intensity has not been sufficiently distributed to the mode group 2.

After the time $t_1$, a light intensity distribution to the mode group 2 increases, and a training starts in the second signal processing circuit (DSP 2). At this time, the first signal processing circuit (DSP 1) still continues performing the resynthesis of the signals of the mode group 1.

After the time $t_2$, it becomes difficult to perform the signal resynthesis in the first signal processing circuit (DSP 1) because the intensity of the mode group 1 attenuates; however, the signal resynthesis has been already started in the second signal processing circuit (DSP 2).

The combining unit 370 includes buffers that have preset lengths for each of the output signals s60a and s60b of the first signal processing circuit (DSP 1) and the second signal processing circuit (DSP 2). This makes it possible to eliminate a phase difference ($\Delta\tau_{skew}$) between two signals resynthesized in the first signal processing circuit (DSP 1) and the second signal processing circuit (DSP 2) and match their phases. Then, a combining process is performed after having matched the both phases. The length of the buffer is a length to absorb sufficiently a maximum differential group delay (DGD) in the multi-mode fiber (MMF) used in the free space optical receiver 300. If $(\tau_2-t_1)>\tau_{trg}$, the interruption does not occur in the output signal s62, and the stable reception can be achieved.

Figure 7:
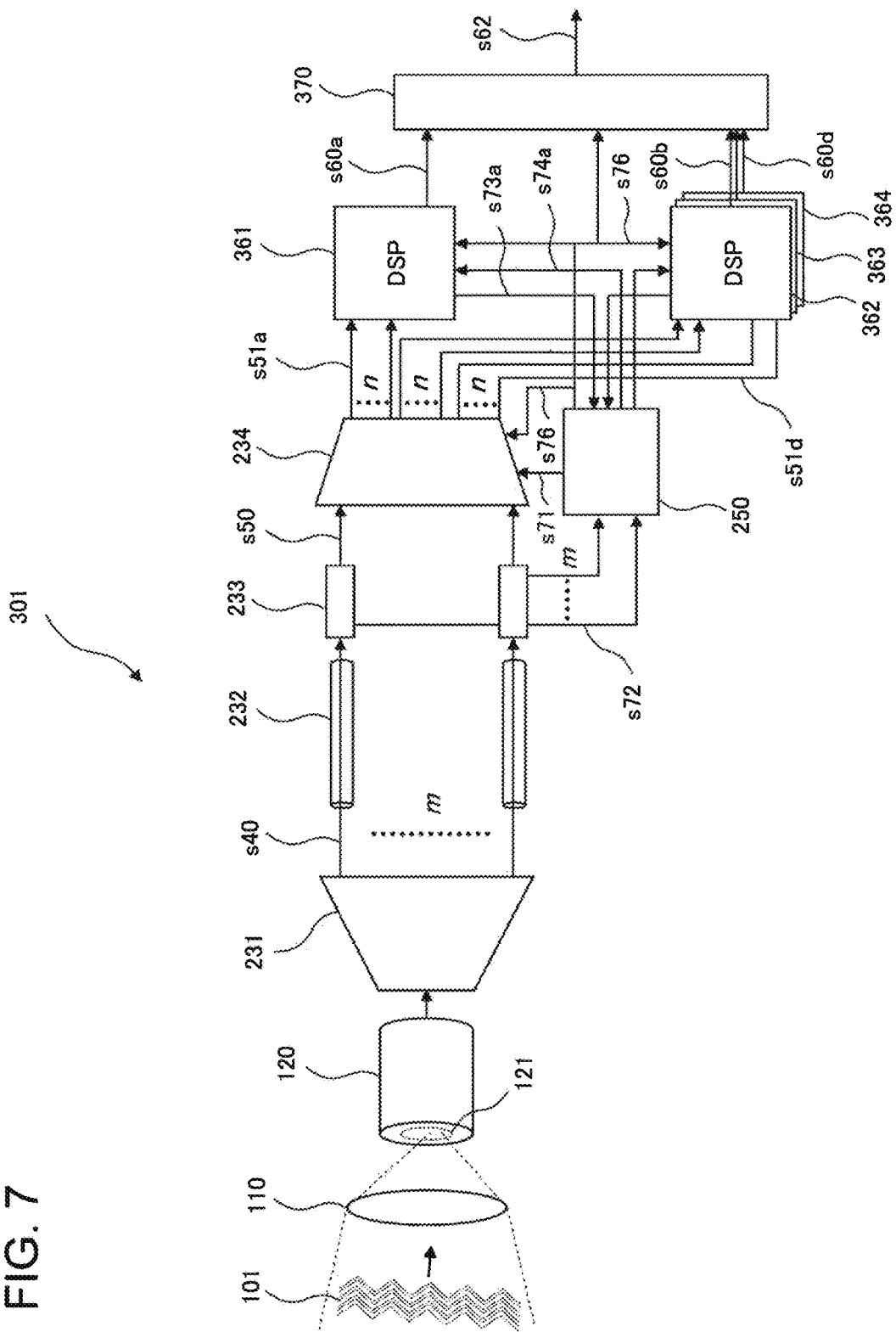
FIG. 7 is a block diagram illustrating another configuration of a free space optical receiver in accordance with the third example embodiment of the present invention.

Next, another configuration of the free space optical receiver according to the present example embodiment is illustrated in FIG. 7. A free space optical receiver 301 has a configuration in which the parallel number of signal processing circuits (DSP) composing the signal processing unit is expanded. FIG. 7 illustrates a configuration including four signal processing circuits (DSP) 361 to 364. The increase in the parallel number of the signal processing circuits (DSP) makes it possible to follow a more complex mode variation and achieve more stable reception in the free space optics (FSO).

Figure 8:
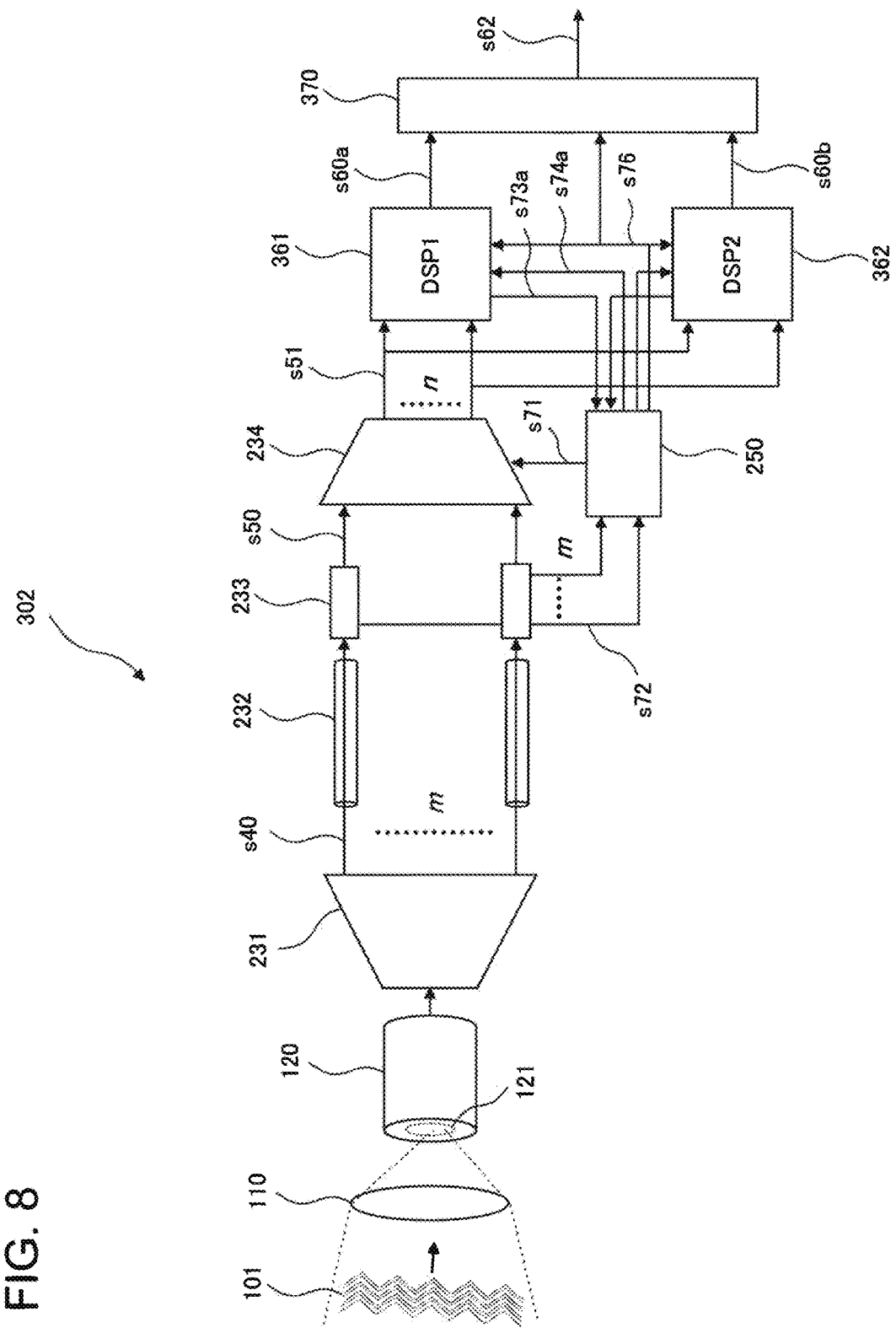
FIG. 8 is a block diagram illustrating yet another configuration of a free space optical receiver in accordance with the third example embodiment of the present invention.

FIG. 8 illustrates yet another configuration of the free space optical receiver according to the present example embodiment. A free space optical receiver 302 has a configuration in which the signal selecting unit 234 distributes the same signal to the first signal processing circuit 361 and the second signal processing circuit 362. If the number of modes excited in the multi-mode fiber (MMF) is small, it becomes possible to reduce the number of outputs of the signal selecting unit 234 and simplify the control by setting the parameters of the first signal processing circuit 361 and the second signal processing circuit 362 at different values.

As mentioned above, the free space optical receivers 300 to 302 of the present example embodiment are configured to selectively receive the signals of the modes excited in the multi-mode fiber (MMF). This makes it possible to suppress an increase in a circuit size of a signal processing circuit and improve the coupling efficiency between received light and a fiber. According to the free space optical receivers 300 to 302 of the present example embodiment, it becomes possible to avoid the interruption of the output signal of the signal processing unit (DSP) even in the time domain in which the mode of the signal light varies.

The effects will be described in more detail. Because the mode excited in the multi-mode fiber (MMF) temporally varies, the combination of the signals received in the signal processing unit (DSP) also varies. If it is assumed that the cause for the deterioration of coupling efficiency of the single-mode fiber (SMF) is nearly equal to that for a mode variation, it is considered that the frequency component of the mode variation is hundreds of hertz at maximum.

On the other hand, a time required for optimizing (training) the parameters of the signal processing unit (DSP) to perform the MIMO process is equal to about 10 milliseconds (msec).

That is to say, there is a possibility that the mode has varied before the training of the signal processing unit (DSP) is finished. It is difficult for the signal processing unit (DSP) to perform stably a resynthesis of received signals in a period during which the training of the signal processing unit (DSP) has not been finished; therefore, it is impossible to stably reproduce the received signals.

However, as mentioned above, the free space optical receivers 300 to 302 of the present example embodiment are configured in which each of the plurality of signal processing circuits performs the resynthesis of inputted received electrical signals, and the combining unit combines the outputs of the plurality of signal processing circuits and outputs an output signal. The plurality of signal processing circuits complementarily operate for mode variation; consequently, while one signal processing circuit performs the signal resynthesis, it becomes possible for the other signal processing circuit to perform the training. This makes it possible to avoid the interruption of the output signal of the signal processing unit (DSP) due to a mode variation of the signal light.

As mentioned above, according to the free space optical receivers 300 to 302 of the present example embodiment, it is possible to cover up the influence by the training of the signal processing unit (DSP) with a mode variation and reduce an interruption time for which signal resynthesis is interrupted, as well as to reduce the circuit size of the signal processing unit (DSP). This makes it possible to perform stable reception in the free space optics (FSO).

In this case, it is possible to reduce a circuit size as compared with the case in which a single signal processing unit (DSP) processes the same input signal. The effect will be described specifically. A free space optical receiver including two signal processing units (DSP) will be described as an example. A circuit size is roughly estimated for the case where the MIMO process by receiving n modes is performed with respect to a certain receiving state. Since the circuit size of the signal processing unit (DSP) performing the MIMO process with n inputs is proportional to $n^2$ in principle, the circuit size of two signal processing units (DSP) becomes equal to $2 \times n^2$. In contrast, if input signals with the same number are processed using a single signal processing unit (DSP), the circuit size becomes equal to $(2n)^2 = 4n^2$ in principle. As a result, according to the free space optical receivers 300 to 302 of the present example embodiment, it is possible in this case to reduce the circuit size of the signal processing circuit (DSP) by half in principle.

A Fourth Example Embodiment

Figure 9:
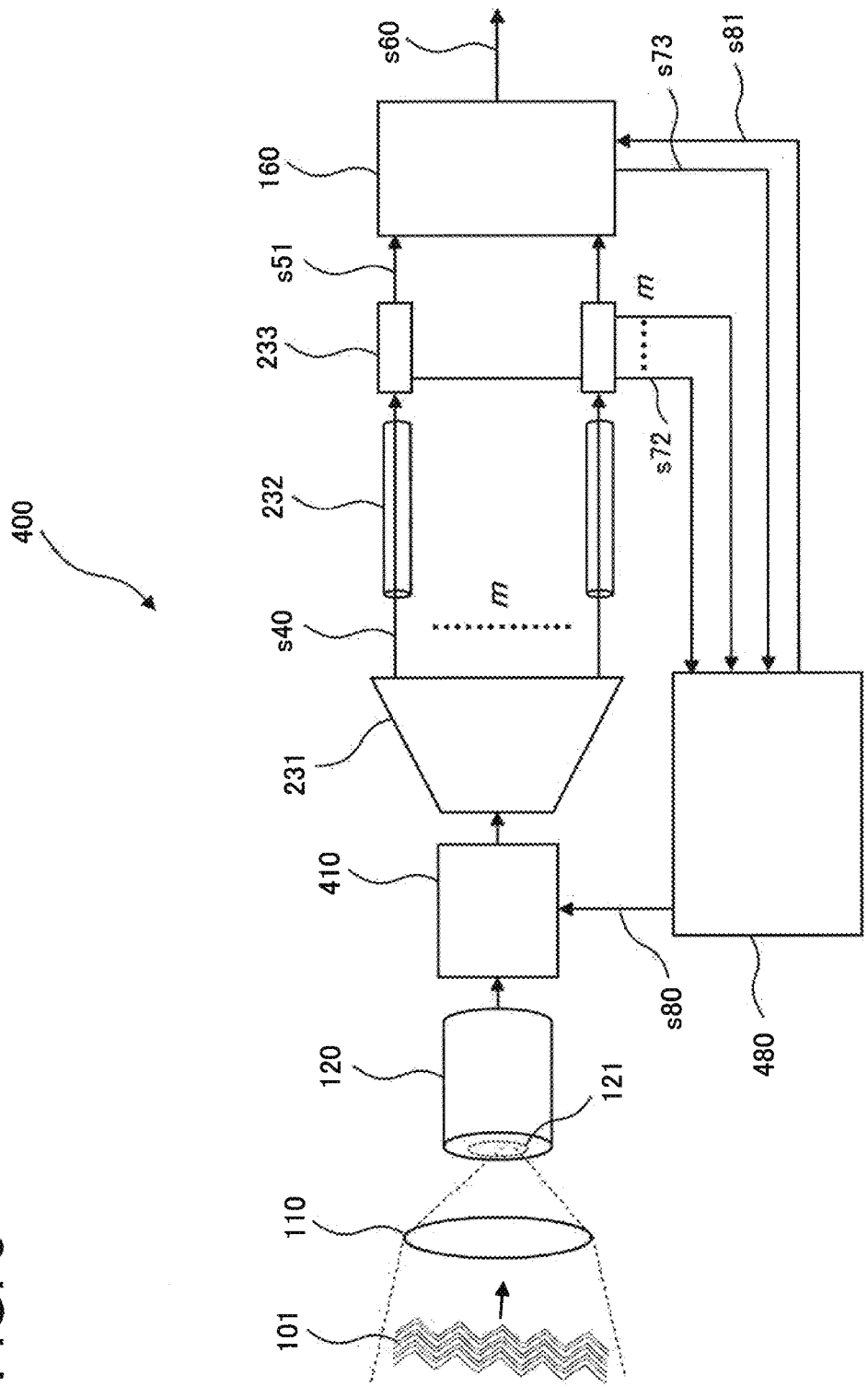
FIG. 9 is a block diagram illustrating a configuration of a free space optical receiver in accordance with a fourth example embodiment of the present invention.

Next, a fourth example embodiment of the present invention will be described. FIG. 9 illustrates a configuration of a free space optical receiver 400 in accordance with the fourth example embodiment of the present invention.

The free space optical receiver 400 includes the light collecting unit 110, the multi-mode transmission medium 120, a mode conversion unit 410, the mode separating unit 231, the plurality of single-mode transmission media 232, the plurality of optical receivers 233, a mode control unit 480 as a control unit, and the signal processing unit 160. The mode conversion unit 410, the mode separating unit 231, the plurality of single-mode transmission media 232, and the plurality of optical receivers 233 compose a multi-mode signal processing unit.

The mode conversion unit 410 converts the optical energy distribution of the multi-mode light output from the multi-mode transmission medium 120 and generates a plurality of propagation mode light beams in which optical energy concentrates. The mode separating unit 231 separates the plurality of propagation mode light beams and outputs each light beam. The single-mode transmission media 232 guide the plurality of propagation mode light beams respectively. The optical receivers 233 receive the plurality of propagation mode light beams through the plurality of single-mode transmission media and demodulate the signals included in the light beams, respectively.

The mode control unit 480 controls the operation of the mode conversion unit 410 based on at least one of the signal information on the plurality of propagation mode light beams and the quality information on received electrical signals calculated by the signal processing unit 160. Specifically, the mode control unit 480 receives an input of signal information on m optical signals s40 after the mode separation, for example, intensity information s72. The mode control unit 480 may obtain quality information s73 on the received electrical signals from the signal processing unit 160. The mode control unit 480 controls the operation of the mode conversion unit 410 using a mode control signal s80. The mode control unit 480 may be configured to notify the signal processing unit 160 of mode information s81 indicating a state of the mode control.

As mentioned above, the mode conversion unit 410 controls multi-mode light so that the intensity distribution of the output signal s40 of the mode separating unit 231 may not be dispersed. Specifically, the mode conversion unit 410 performs mode conversion on the multi-mode light so that it may be avoided for energy to be dispersed on many modes with the light intensity concentrating in a single-mode or a few modes.

In the above-described operation, it becomes possible to reduce the circuit size of the signal processing unit 160 because the mode conversion unit 410 operates so as to reduce the number of received electrical signals s51 to be supplied to the signal processing unit 160. That is to say, according to the free space optical receiver 400 of the present example embodiment, it is possible to suppress an increase in a circuit size of a signal processing circuit and improve the coupling efficiency between received light and a fiber.

A Fifth Example Embodiment

Figure 10:
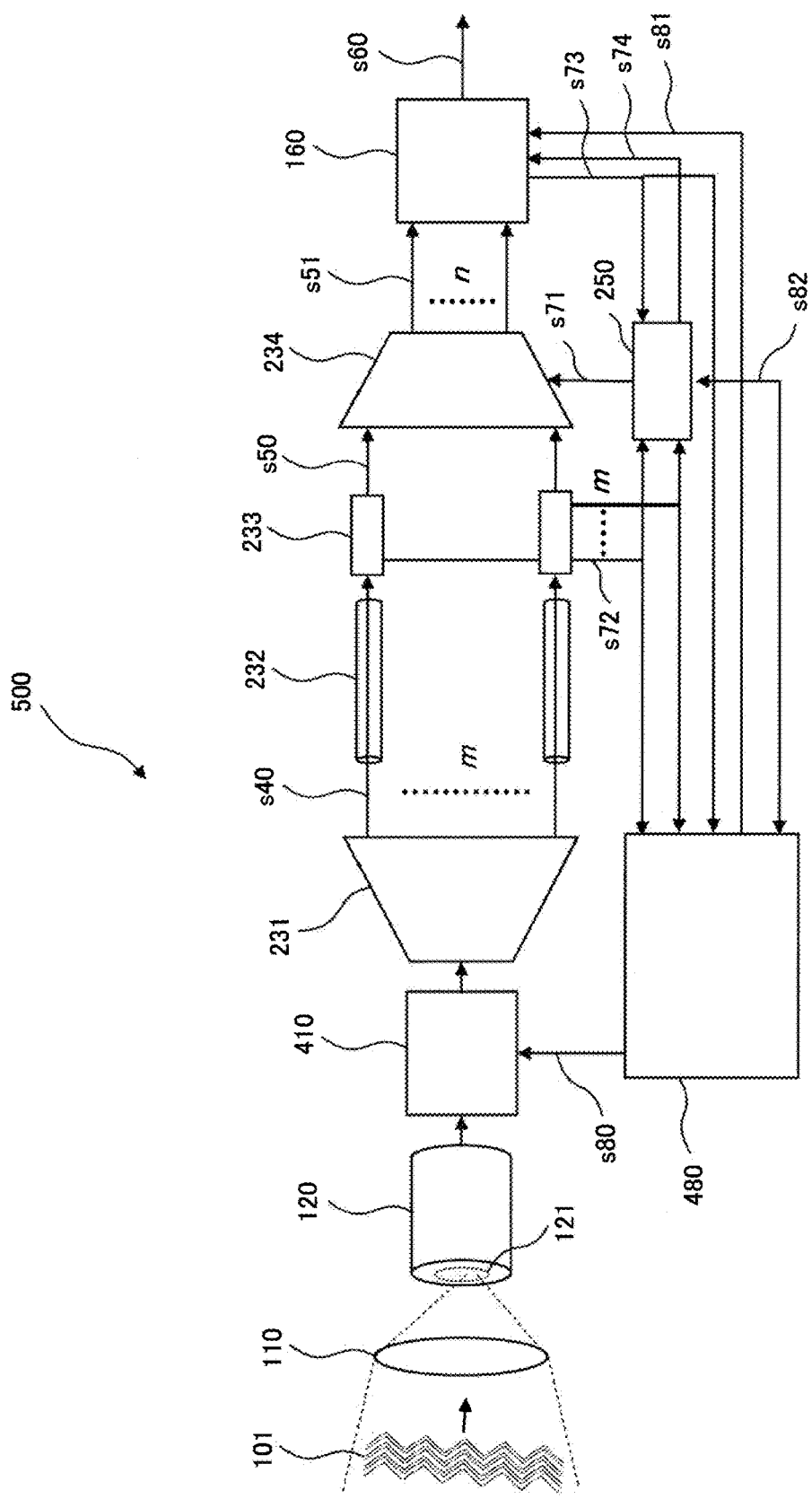
FIG. 10 is a block diagram illustrating a configuration of a free space optical receiver in accordance with to a fifth example embodiment of the present invention.

Next, a fifth example embodiment of the present invention will be described. FIG. 10 illustrates a configuration of a free space optical receiver 500 in accordance with the fifth example embodiment of the present invention.

As illustrated in FIG. 10, the free space optical receiver 500 of the present example embodiment has a configuration in which the signal selecting unit 234 and the selection control unit 250 in the free space optical receiver 200 of the second example embodiment are included in addition the free space optical receiver 400 according to the fourth example embodiment. That is to say, the free space optical receiver 500 further includes the signal selecting unit 234 that is disposed in at least one of a stage preceding and a stage following the plurality of optical receivers 233. The signal selecting unit 234 selects and outputs a part of a plurality of input signals. The selection control unit 250 as a control unit controls the operation of the signal selecting unit 234 based on at least one of signal information on a plurality of propagation mode light beams and quality information on received electrical signals calculated by the signal processing unit 160.

The free space optical receiver 500 of the present example embodiment can be configured to include a plurality of signal processing circuits as the signal processing unit 160 as is the case with the free space optical receiver 300 according to the third example embodiment.

In the free space optical receiver 500 of the present example embodiment, the signal selecting unit 234 selects only strong optical signals in which the light intensity is concentrated and supplies the selected signals to the signal processing unit 160 as received electrical signals s51, in conjunction with the operation of the mode conversion unit 410. At this time, the selection control unit 250 may use light intensity information s72 on optical signals s40 for each mode or signal quality information s73 from the signal processing unit 160, for example. The selection control unit 250 may be configured to operate in conjunction with the mode control unit 480 through a control signal s82. At this time, signals used as the control signal s82 include selection mode information by the mode conversion unit 410, connecting information by the signal selecting unit 234, and the like, for example. Exchanging these control signals enables the mode conversion unit 410 to operate in cooperation with the signal selecting unit 234; consequently, it becomes possible to receive signals with a high S/N ratio.

In the above-described operation, the mode conversion unit 410 operates so as to reduce the number of received electrical signals s51 to be supplied to the signal processing unit 160; therefore, it becomes possible to reduce the circuit size of the signal processing unit 160. That is to say, according to the free space optical receiver 500 of the present example embodiment, it is possible to suppress an increase in a circuit size of a signal processing circuit and improve the coupling efficiency between received light and a fiber.

Next, the operation of the free space optical receiver 500 according to the present example embodiment will be described in more detail.

Figure 11A:
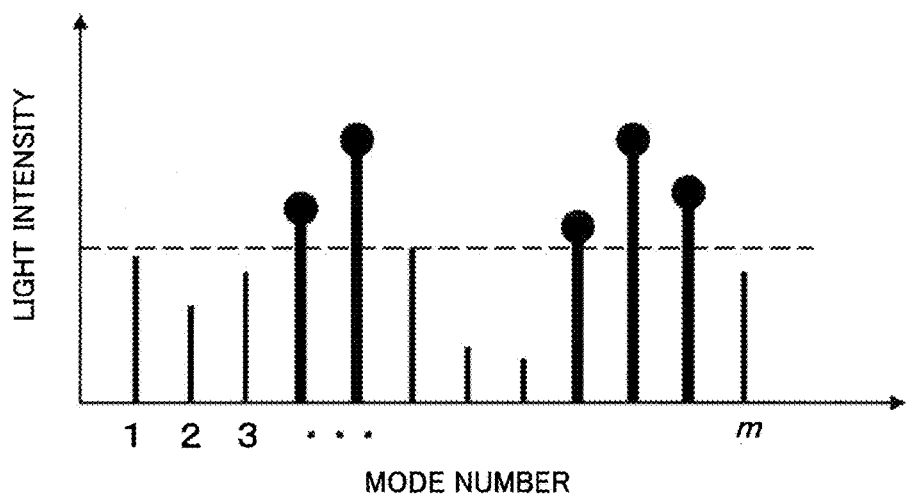
FIG. 11A is a schematic diagram schematically illustrating a modal distribution to describe the operation of a free space optical receiver in accordance with the fifth example embodiment of the present invention and a diagram if no mode conversion is applied.
Figure 11B:
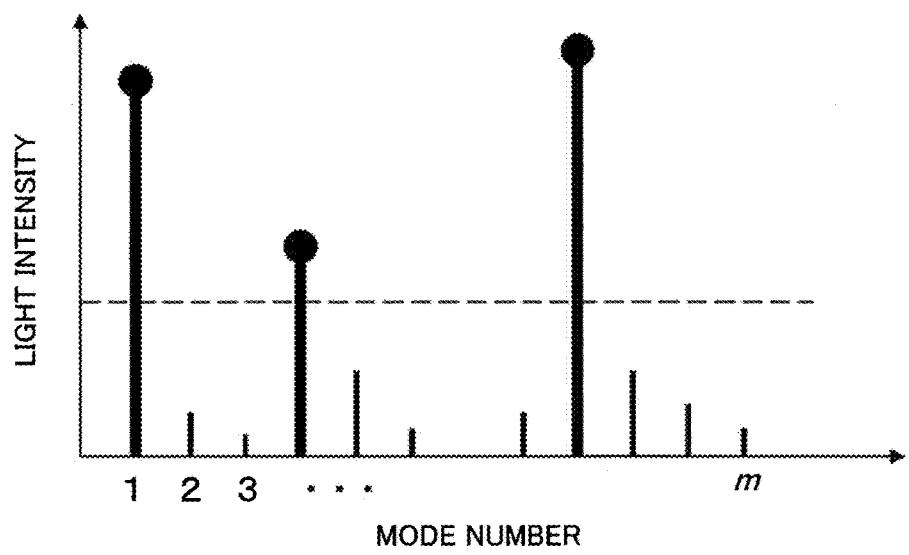
FIG. 11B is a schematic diagram schematically illustrating a modal distribution to describe the operation of a free space optical receiver in accordance with the fifth example embodiment of the present invention and a diagram illustrating a modal distribution after mode conversion.
Figure 11C:
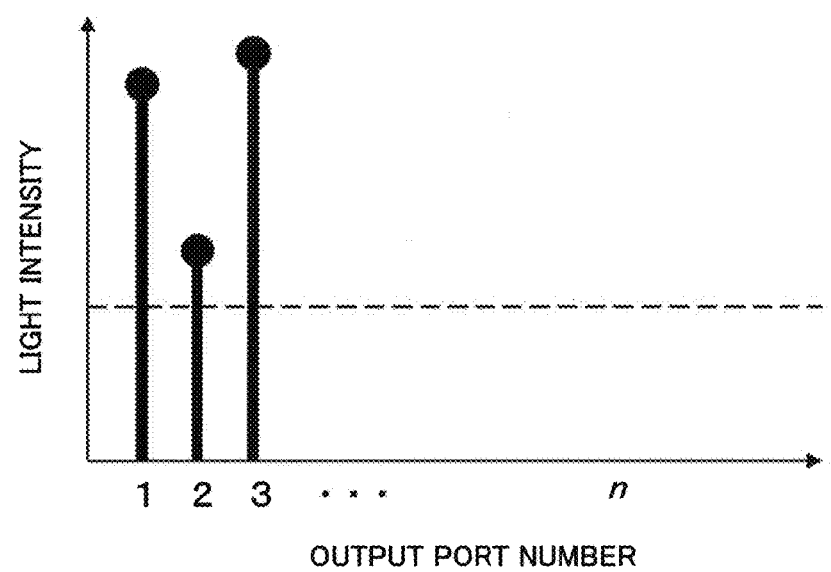
FIG. 11C is a schematic diagram schematically illustrating a modal distribution to describe the operation of a free space optical receiver in accordance with the fifth example embodiment of the present invention and a diagram illustrating a modal distribution after a signal selecting unit makes a selection.

With reference to FIG. 11A, FIG. 11B, and FIG. 11C, the process of selecting the received electrical signals s51 by the cooperative operation of the mode conversion unit 410 and the signal selecting unit 234, will be described.

FIG. 11A is a schematic diagram schematically illustrating a light intensity distribution of respective modes output from the mode separating unit 231 when mode conversion is not applied. As is the case illustrated in FIG. 3, it can be understood that there are a plurality of signals having light intensity slightly less than a threshold value.

FIG. 11B illustrates a light intensity distribution of respective modes after mode conversion having passed through the mode conversion unit 410. It can be understood from the figure that modes having light intensity slightly less than the threshold value are remarkably reduced, and the optical energy is concentrated in a few modes instead. It is considered that the intensity distribution of the mode varies by the mode conversion from the modal distribution illustrated in FIG. 11A to the modal distribution illustrated in FIG. 11B, but the energy of signals is conserved in principle.

FIG. 11C illustrates an intensity distribution of optical signals inputted into the optical receivers 233 when the signal selecting unit 234 selects signals with a high S/N ratio. In this example, the signal selecting unit 234 collects only three signals exceeding the threshold value at an output port side with a smaller number and outputs them, and puts the other output ports into no-signal states by making their connection circuits open.

The mode control unit 480 controls the mode conversion unit 410 based on the distribution of the signal intensity s72 and performs the above-mentioned mode conversion. The selection control unit 250 controls a connection in the signal selecting unit 234 based on the distribution of the signal intensity s72 after the mode conversion. The selection control unit 250 may control the connection in the signal selecting unit 234 so that signals with a good S/N ratio can be supplied to the signal processing unit 160, based on the distribution of the signal intensity and the control signal s82 of mode conversion information output from the mode control unit 480.

Next, the operation of the mode control unit 480 will be described. The mode control unit 480 observes the intensity distribution of the signal s40 after the mode separation at a predetermined cycle, and optimally corrects the state of the mode conversion unit 410. The mode control unit 480 can be configured by an electronic circuit, a computer and the like, which repeat a control operation according to a predetermined algorithm.

Figure 12:
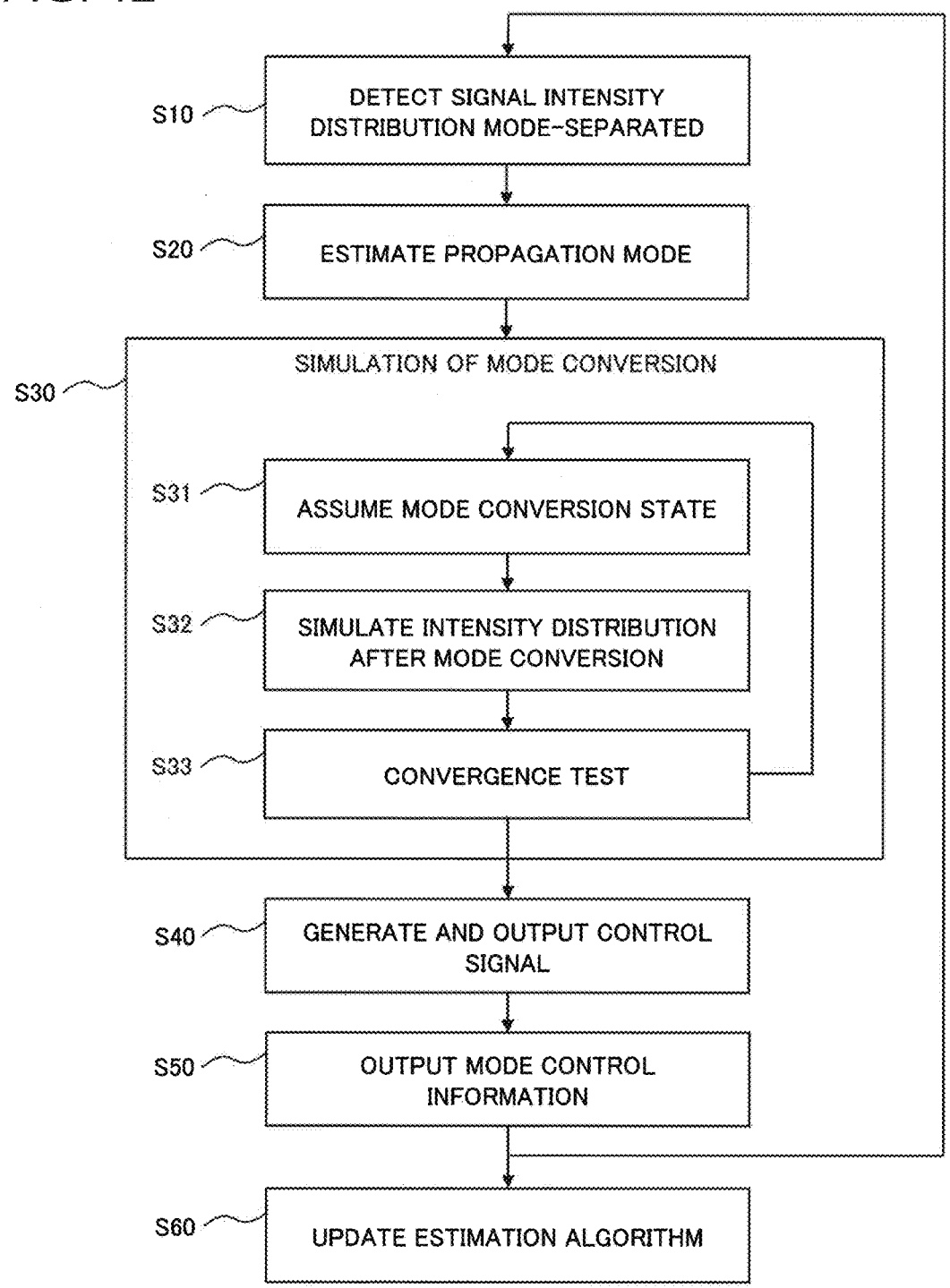
FIG. 12 is a flowchart to describe the operation of a mode control unit included in a free space optical receiver in accordance with the fifth example embodiment of the present invention.

The operation of the mode control unit 480 will be described in more detail using a flowchart illustrated in FIG. 12. First, the mode control unit 480 collects intensity information s72 of each signal s40 mode-separated and detects a mode intensity distribution (step S10). From the mode intensity distribution, a propagation mode in the multi-mode transmission medium 120 is estimated (step S20).

Next, the mode control unit 480 simulates the mode conversion (step S30). First, it is assumed using the propagation mode estimated in step S20 that a coupled state of modes causing the mode conversion varies (step S31). Based on the assumption, a simulation is performed on the mode intensity distribution after the mode conversion (step S32). Then, the assumed mode conversion state is compared with a current state, and a convergence test is performed by comparing quality judgment (step S33). For example, if an error is equal to or less than a predetermined threshold value, it can be determined that the simulation has converged. Alternatively, the convergence test may be performed by local minimization. It is not limited to this; an S/N ratio of each mode is estimated by a predetermined calculation method from the distribution of the intensity information s72, and the convergence test may be performed by comparing the S/N ratio at this time with a predetermined reference. In addition, the convergence test may be performed by a predetermined method using a sum value of received light intensities as a reference.

After performing the convergence test, the control signal s80 is generated from a predetermined calculating formula so that the mode conversion state assumed in step S31 may be achieved, and the control signal s80 is output to the mode conversion unit 410 (step S40). Update information on mode conversion, information on an intensity distribution estimated from simulation, information indicating the degree of wave-front distortion that can be indirectly estimated from a propagation mode, and the like are output to at least one of the selection control unit 250 and the signal processing unit 160 (S50). Then, the procedure returns to the intensity distribution detection of step S10. In addition, based on the learning of error information obtained by repeating the above sequence, mode estimation and mode conversion algorithms may be updated (step S60). Depending on the method used in the mode conversion simulation (step S30), the step (step S20) for estimating the propagation mode may be performed or omitted.

By the above-mentioned operation of the mode control unit 480, it is possible to improve an S/N ratio of the mode-separated signal light and to avoid the deterioration of an S/N ratio of the signals to be supplied to the signal processing unit 160.

As mentioned above, the free space optical receiver 500 of the present example embodiment is configured to include the mode conversion unit 410 and the mode control unit 480. This makes it possible to control mode conversion by following the wave-front distortion of the received light. The mode control unit 480 controls a mode distribution of converted output light based on a predetermined method using a signal from the monitor unit. The objects that the monitor unit monitors include a wave-front state of incident light, a light intensity or a wave-front state after having passed through the mode conversion unit 410, a light intensity distribution after the mode separation, signal quality information on each signal that the signal processing unit 160 can detect, and the like, for example. The signal quality information includes an average intensity, an S/N ratio, a Q value, phase information, a symbol error rate, and the like. It is preferable for the mode control unit 480 to perform a control so that an optical signal intensity may concentrate in a few modes and lower order modes possible in the modes of output light after conversion.

The above-described configuration makes it possible, according to the free space optical receiver 500 of the present example embodiment, to reduce the number of input signals into the signal processing unit 160 and to simultaneously keep an S/N ratio of a signal to be supplied to the signal processing unit 160 at a high level. This makes it possible to achieve stable reception in the free space optics (FSO) and reduction in the circuit size of the signal processing unit (DSP). As a result, it is possible to achieve miniaturization and low cost of a free space optical receiver by which the influence of scintillation can be reduced and high capacity transmission can be performed.

As mentioned above, only some modes are excited in the multi-mode fiber (MMF), but it is difficult to stably receive a high order mode optical signal. For example, there is a possibility that high order mode light will be easily coupled between modes during the propagation through the multi-mode fiber (MMF) and the power will be dispersed into a plurality of modes. This makes it difficult to receive signals stably due to the deterioration of the S/N ratio of an optical signal after the mode separation.

However, the free space optical receiver 500 of the present example embodiment is configured to control an excitation mode of the multi-mode fiber (MMF) and excite a few modes selectively, which makes it possible to improve the S/N ratio of an optical signal after the mode separation.

The effect will be described in more detail.

As mentioned above, in the free space optical receiver 200 according to the second example embodiment illustrated in FIG. 2, the signal selecting unit 234 selects signals with a strong mode intensity distribution from among the received signals s40 that are mode-separated into m modes according to a predetermined rule. This makes it possible to reduce the circuit size of the signal processing unit 160.

At this time, (m-n) signals other than the selected signals are discarded. Consequently, the information amount that the signal processing unit 160 receives decreases by a light intensity distributed to the modes to be discarded from the optical signals irradiated to the core 121 of the multi-mode transmission medium 120. This point will be described concretely using the example illustrated in FIG. 3. As illustrated in FIG. 3, many modes are excited with the optical signals coupled to the multi-mode transmission medium 120. Among those modes, only modes having a signal intensity exceeding a threshold value indicated by a dashed line (five thick lines with circles) are assumed to be selected and received in the signal selecting unit 234. In this case, the signals having a signal intensity less than the threshold value other than the selected five signals are discarded.

In the example of FIG. 3, there are a plurality of modes with an intensity slightly less than the threshold value, but each of these signals alone cannot obtain a sufficient S/N ratio. However, the optical energy to be discarded increases if the number of such modes, each of which has a light intensity equal to or less than the threshold value, increases; therefore, the efficiency of optical reception decreases as a whole.

However, the free space optical receiver 500 of the present example embodiment has the configuration in which the mode conversion unit 410 converts the optical energy distribution of multi-mode light output from the multi-mode transmission medium 120 and generates a plurality of propagation mode light beams in which optical energy concentrates. This makes it possible, even in the above-mentioned case, to avoid the loss of signal energy, that is, the deterioration of the S/N ratio of the signal, due to discarding modes that the signal selecting unit 234 does not receive.

A Sixth Example Embodiment

Figure 13:
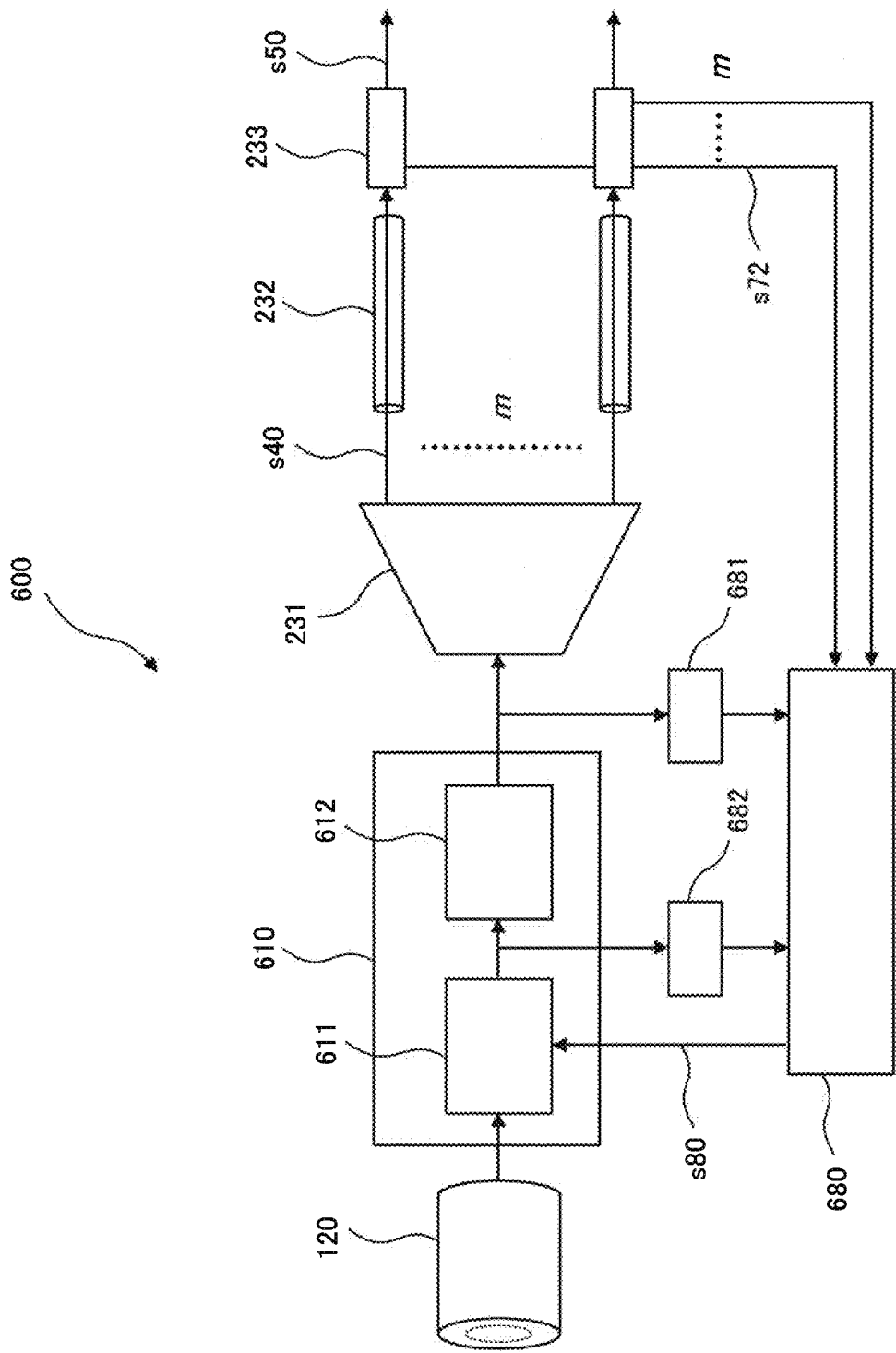
FIG. 13 is a block diagram illustrating a configuration of main components of a free space optical receiver in accordance with a sixth example embodiment of the present invention.

Next, a sixth example embodiment of the present invention will be described. FIG. 13 illustrates a main part of the configuration of a free space optical receiver 600 in accordance with the sixth example embodiment of the present invention.

The free space optical receiver 600 includes the multi-mode transmission medium 120, a mode conversion unit 610, the mode separating unit 231, the plurality of single-mode transmission media 232, the plurality of optical receivers 233, and a mode control unit 680 as a control unit. The mode conversion unit 610, the mode separating unit 231, the plurality of single-mode transmission media 232, and the plurality of optical receivers 233 compose a multi-mode signal processing unit. The free space optical receiver 600 differs in the configuration of the mode conversion unit 610 from the free space optical receivers 400 and 500 according to the fourth example embodiment and the fifth example embodiment.

The mode conversion unit 610 includes a variable mode scrambler 611 and a mode filter 612. The variable mode scrambler 611 includes a multi-mode fiber and an actuating unit configured to apply mechanical action to the multi-mode fiber. The mode control unit 680 controls the operation of the actuating unit. Hereinafter, the configuration of the variable mode scrambler 611 will be described concretely.

The variable mode scrambler 611 is an optical fiber component having a function to scramble propagation modes of received optical signals inputted from the multi-mode transmission medium 120. Specifically, a scrambler using a fiber coil, a micro-bending, or an offset launch can be used. Such a mode scrambler makes use of generating a mode coupling in a multi-mode fiber (MMF) by stress of a coil of the multi-mode fiber (MMF) and exchanging optical energy between modes.

The mode control unit 680 controls a curvature or a stress of the multi-mode fiber (MMF) composing the variable mode scrambler 611. Specifically, the mode control unit 680 makes the curvature, tension, or stress of a fiber coil vary along with a control signal s80 using mechanical adjustment means by electrical control, such as a piezoelectric element and a coil embedded in the variable mode scrambler.

The number of modes that the variable mode scrambler 611 can propagate is equal to or larger than the number of modes that can propagate through the multi-mode transmission medium 120. It is preferable for the variable mode scrambler 611 to have the ability in principle to combine with all of the modes that propagate through the multi-mode transmission medium 120 and to have the ability to be coupled at sufficiently small loss. The reason is that it is necessary to mode-convert without loss optical signals coupled to the multi-mode transmission medium 120 with high coupling efficiency. If the number of propagation modes of the variable mode scrambler 611 is smaller than that of the multi-mode transmission medium 120, signal light of some modes becomes a loss before the mode conversion; therefore, it becomes an obstacle to the free space optics (FSO) reception with high efficiency.

The signal light mode-converted in the variable mode scrambler 611 can be connected to the mode filter 612. The mode filter 612 selectively propagates signal light within a predetermined mode range. A multi-mode fiber (MMF) having a small core diameter can be used as the mode filter 612, for example. Specifically, a multi-mode fiber (MMF) can be applied through which only two to several tens of lower order modes can propagate. Alternatively, a technology for making a higher-order mode diffuse (lose) selectively may be applied.

The number of modes that can propagate through a multi-mode fiber (MMF) composing the multi-mode transmission medium 120 and the variable mode scrambler 611 is number in hundreds. In contrast, if the mode separating unit 231 in a following stage is configured to separate several hundreds of modes, the difficulty in implementation conditions such as a volume and cost in achieving a free space optical receiver increases. On the other hand, if the number of modes to be separated is limited in order to ease conditions for implementation, a mode crosstalk is caused because an inseparable higher-order mode is inputted into the mode separating unit 231. However, the free space optical receiver 600 of the present example embodiment disposes the mode filter 612 corresponding to the number of mode separation in a stage preceding the mode separating unit 231 and is configured to remove a higher-order mode in advance. The configuration makes it possible to prevent unnecessary mode crosstalk.

As mentioned above, the variable mode scrambler 611 includes a multi-mode fiber (MMF), and the mode filter 612 is configured also using an optical fiber. This makes it possible to consider the multi-mode transmission medium 120 and the mode conversion unit 610 to be an integral component having a plurality of functions. Consequently, it is possible to achieve the configuration by segmenting a transmission path of the multimode fiber (MMF) into each function without dividing one multi-mode fiber (MMF), for example. A plurality of fibers fusion-spliced can also be used as the above-mentioned single component, for example.

A series of functions performed by the multi-mode fiber (MMF), that is, the variable mode scrambler 611, the mode filter 612, and the mode separating unit 231, may be achieved by applying a three-dimensional optical waveguide device. For example, because a Photonic Lantern (PL) of a three-dimensional optical waveguide has input characteristics equivalent to those of the multi-mode fiber (MMF) at a multi-mode side, it can add the functions of the variable mode scrambler 611. It is also possible to add the functions of the mode filter 612 by appropriately designing a waveguide mode at the multi-mode side of the PL. The PL can couple an optical signal inputted in a multi-mode with a plurality of single-mode fibers (SMF) without loss in principle. At this time, orthogonal mode states are output to the plurality of single-mode fibers (SMF), and mode separation is performed by a MIMO process in the signal processing unit 160 in the following stage. Here, the mode separation is not performed in a strict sense in the output of the PL to the single-mode fibers (SMF); however, it is possible to perform the mode separation by a combination with the processing in the signal processing unit 160. Consequently, the PL can be used as means for performing the mode separating function in the free space optical receiver 600 of the present example embodiment.

An optical fiber amplifier may be inserted into the mode conversion unit 610 and compensate for internal loss of the mode conversion unit 610. For example, in the case of a fiber transmission wavelength band of 1.55 micrometer (μm), a multi-mode erbium-doped fiber amplifier (MM-EDFA) can be shared with the multi-mode transmission medium 120 and the variable mode scrambler 611. Alternatively, the mode filter 612 may be shared with a few mode erbium-doped fiber amplifier (FM-EDFA) for few mode fiber (FMF) transmission.

Next, the operations of the mode conversion unit 610 and the mode control unit 680 will be described.

The mode control unit 680 can monitor a light intensity distribution for each mode using an intensity signal s72 of an optical signal after the mode separation, as is the case with the free space optical receivers 400 and 500 according to the fourth example embodiment and the fifth example embodiment. In addition, the mode control unit 680 can obtain mode intensity distribution information by dividing the output light of the mode filter 612 and observing the divided output light using monitor means 681 as illustrated in FIG. 13. In this case, the monitor means 681 may simply measure a light intensity.

The operations of the mode conversion unit 610 and the mode control unit 680 will be described more concretely using FIG. 14A and FIG. 14B. As an example, the number of modes that the mode separating unit 231 can separate is assumed to be five. Modes added with circles in the figures represent separable modes.

Figure 14A:
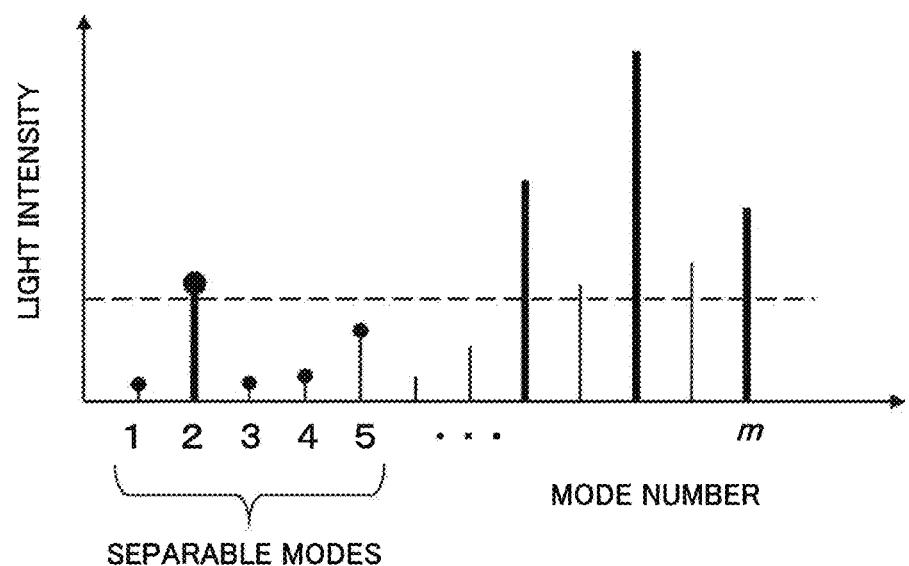
FIG. 14A is a schematic diagram schematically illustrating a modal distribution to describe the operation of a mode conversion unit included in a free space optical receiver in accordance with the sixth example embodiment of the present invention.

If the results of the mode conversion by the mode conversion unit 610 are the state illustrated in FIG. 14A, most of the modes having a signal intensity exceeding a threshold value lie in a higher-order mode that cannot be separated at a following stage. At this time, the light intensity of the output of the mode filter 612 observed by the monitor means 681 is equal to the sum value of the light intensities of five modes that are separable. Consequently, if the mode state is a state illustrated in FIG. 14A, the light intensity of the five modes is small. In contrast, if the mode state is a state illustrated in FIG. 14B, the light intensity observed by the monitor means 681 becomes larger.

Figure 14B:
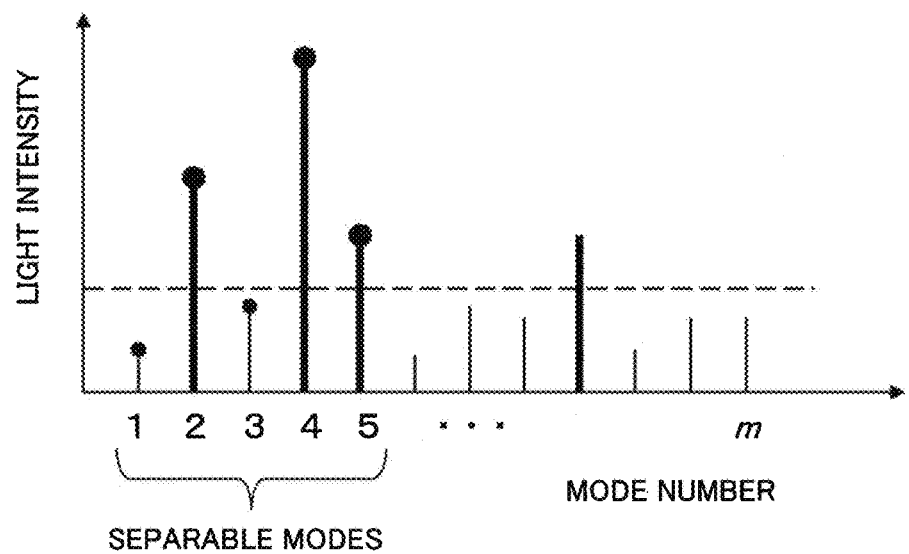
FIG. 14B is a schematic diagram schematically illustrating another modal distribution to describe the operation of a mode conversion unit included in a free space optical receiver in accordance with the sixth example embodiment of the present invention.

When the two states illustrated in FIG. 14A and FIG. 14B are compared, it is understood that the light intensity received by the optical receivers 233 can be controlled so as to be maximized by monitoring the sum value of the light intensities of the five modes that are separable by the monitor means 681. If fine tuning is performed in order to perform an accurate mode conversion, it is necessary to obtain a mode intensity distribution from the intensity signal s72. However, for the purpose of coarse adjustment of mode conversion or search of a maximum value, it is effective to use the monitor means 681 by which single intensity information can be obtained.

It is also possible to observe similar mode intensity distribution information by using the monitor means 682 illustrated in FIG. 13. The monitor means 682 has a function of directly measuring a mode distribution after the mode conversion. A wave-front sensor and the like can be used as the monitor means 682, for example.

Figure 15:
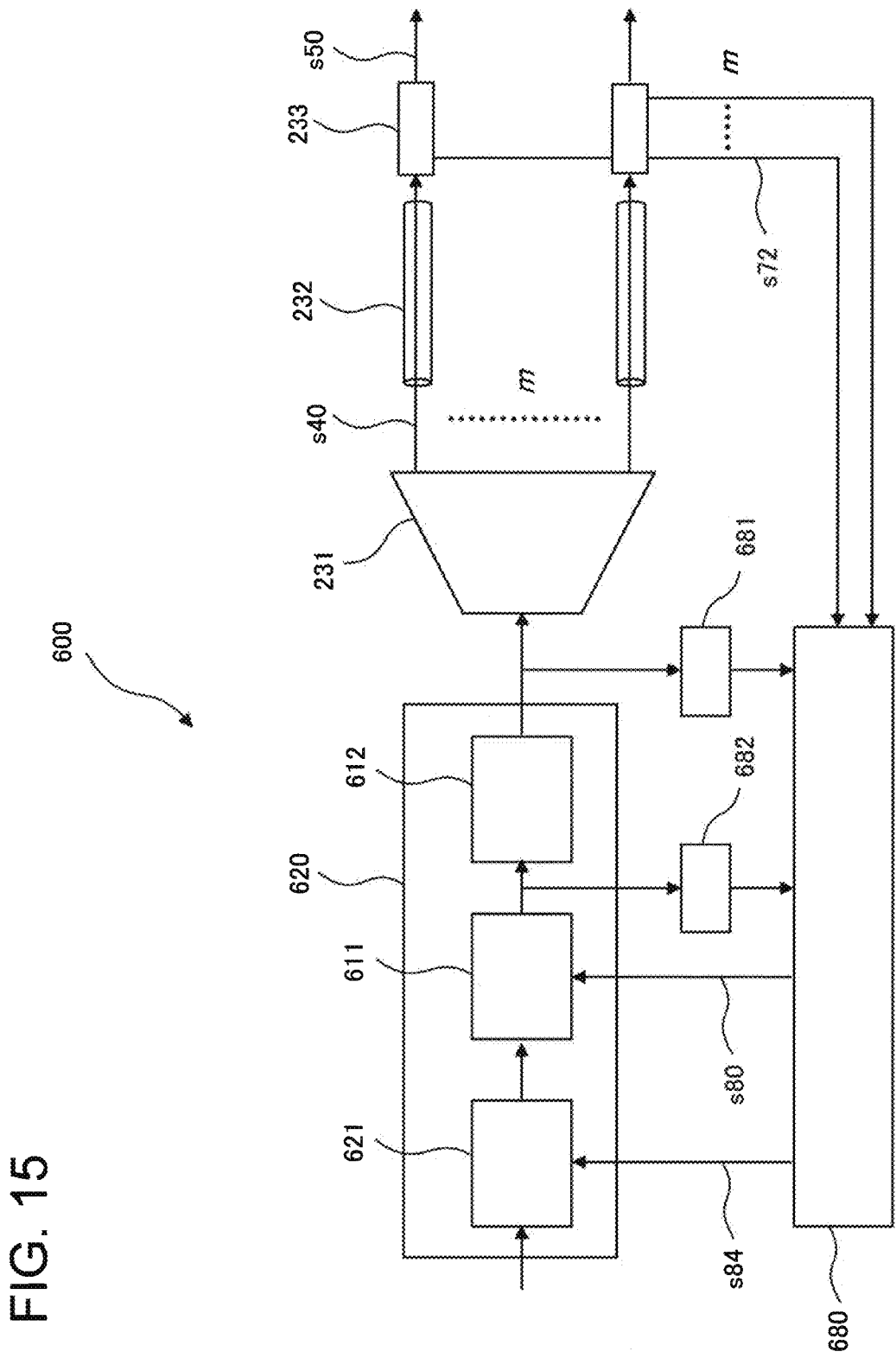
FIG. 15 is a block diagram illustrating a configuration of a mode conversion unit included in a free space optical receiver in accordance with the sixth example embodiment of the present invention.

FIG. 15 illustrates another configuration of the mode conversion unit according to the present example embodiment. A mode conversion unit 620 illustrated in FIG. 15 includes a beam scanner 621 in a stage preceding the variable mode scrambler 611. The mode conversion unit 620 with the configuration makes a mode coupling state in the variable mode scrambler 611 a fixed state or semi-fixed state and variably controls the modes using the beam scanner 621 disposed outside the variable mode scrambler 611. This makes it possible to perform the function similar to that of the above-mentioned mode conversion unit 610.

The semi-fixed variable mode scrambler 611 used in the mode conversion unit 620 can cope with a mechanical offset of an optical system or a state variation in an optical system side, for example, a variation with a long time constant corresponding to a variation in a focal distance, an opening diameter, or the like. In contrast, the beam scanner 621 is used in order to cope with a variation in scintillation with a short time constant. As the means for controlling propagation conditions for such a multi-mode fiber, a technology to control a bandwidth of a multi-mode fiber (MMF), a mode conversion technology and the like have been known.

Next, the operating principle of the beam scanner 621 will be described. The beam scanner 621 uses a phenomenon that an excited propagation mode varies with respect to a variation in an irradiation position of light beams in a core area of the multi-mode fiber (MMF). When a Gaussian beam with a fundamental mode is irradiated to a peripheral part of the core of the multi-mode fiber (MMF), a higher-order mode is excited. Since the propagation of beams is reversible, a fundamental mode is excited in principle in the multi-mode fiber (MMF) if the higher-order mode can be irradiated appropriately to the peripheral part of the core. However, because the wave-front of light having propagated through the space has been disordered in a state overlapped complexly, the ideal reverse conversion as mentioned above is difficult.

The mode conversion unit 620 according to the present example embodiment, using the multi-mode fiber (MMF) as the variable mode scrambler 611 having a mode scrambler function, scans irradiation positions of received beams on the core surface by means of the beam scanner 621. The mode control unit 680 controls the beam scanner 621 by a control signal s84. The control that the mode control unit 680 performs at this time is similar to the control over the variable mode scrambler 611 in the mode conversion unit 620.

The mode conversion unit 620 illustrated in FIG. 15 is configured to include the variable mode scrambler 611 provided in the mode conversion unit 610. However, since the mode conversion unit 620 includes the beam scanner 621, it is only necessary to include a transmission medium that can excite a multimode, not applying only to the variable mode scrambler 611. For example, a simple multi-mode fiber (MMF) without an actuating unit or an optical waveguide may be used.

The multi-mode transmission medium 120 optically coupled by the light collecting unit 110 may be disposed in a stage preceding or following the beam scanner 621. If the multi-mode transmission medium 120 is disposed in a stage following the beam scanner 621, collected optical signals are inputted into the multi-mode transmission medium 120 after passing through the beam scanner 621. In this case, as mentioned above, the multi-mode transmission medium 120 and the variable mode scrambler 611 can be configured as an integrated component.

Figure 16:
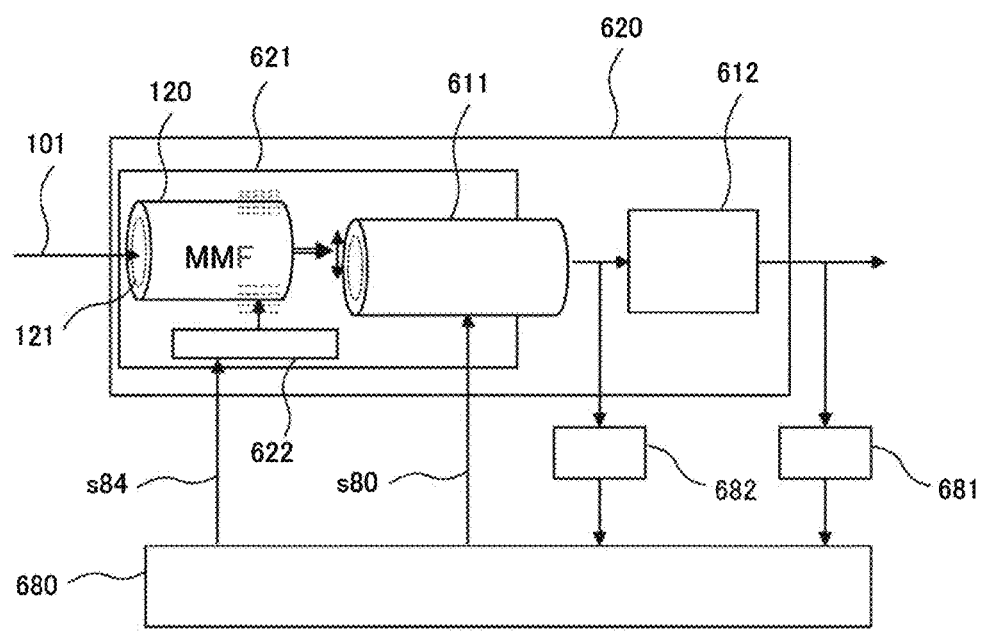
FIG. 16 is a block diagram illustrating a specific configuration example of a mode conversion unit included in a free space optical receiver in accordance with the sixth example embodiment of the present invention.

FIG. 16 illustrates a concrete configuration example of the beam scanner 621 illustrated in FIG. 15. In this example, a variable beam is achieved by making variable a mechanical position of an emitting end of a multi-mode fiber (MMF) as the multi-mode transmission medium 120 coupled to received light. At this time, it is possible to control the position of the multi-mode fiber (MMF) using a piezoelectric element 622. Instead of the configuration in which the emitting position of the multi-mode fiber (MMF) is variable, a configuration may be used in which the emitting position is made variable using a movable lens and a mirror. In addition, instead of the lens and the mirror, it is possible to perform beam scanning using an optical crystal having an electro-optic effect or a magneto-optical effect and a control signal that is applied to it.

The mode control unit 680 controls the position of the piezoelectric element 622, or the positions of the lens and the mirror. As mentioned above, the mode control unit 680 performs optimization control based on the monitoring results of a light intensity or a mode distribution on an emitting side of the mode filter 612 in a following stage, or signal quality information that is detected by the signal processing unit 160. At this time, the mode control unit 680 may perform the mode estimation process described using FIG. 12.

Figure 17:
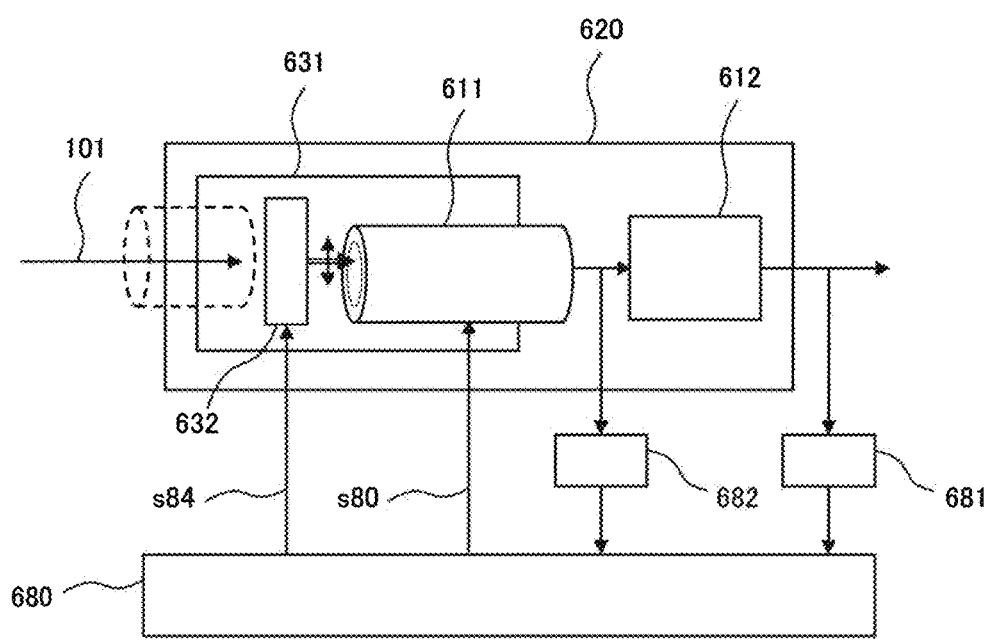
FIG. 17 is a block diagram illustrating another specific configuration example of a mode conversion unit included in a free space optical receiver in accordance with the sixth example embodiment of the present invention.

FIG. 17 illustrates another concrete configuration example of the beam scanner. A beam scanner 631 includes a spatial modulator 632. The mode control unit 680 controls the spatial modulator 632 based on the monitoring results of a mode distribution mode-separated in a following stage, or signal quality information that is detected by the signal processing unit 160. At this time, the mode control unit 680 may perform the mode estimation process described using FIG. 12. In FIG. 17, the spatial modulator 632 has a transmissive configuration; however, the spatial modulator 632 is not limited to this and may have a reflective configuration.

In order to improve the coupling efficiency to a single-mode fiber (SMF) using the spatial modulator 632, it is necessary in general to perform a precise wave-front detection of inputted light and a wave-front estimation process using Fourier transform and the like that require mass calculation. However, in the configuration of the free space optical receiver 600 according to the present example embodiment, it is unnecessary to convert incident light into a plane wave. This is because it is only necessary in the free space optical receiver 600 according to the present example embodiment to convert the incident light into modes that the mode separating unit 231 can mode-separate after passing through the mode conversion unit 620, as described in FIG. 14A and FIG. 14B. Consequently, mass calculation generally required becomes unnecessary because an optimum solution to generate a single wave-front is not necessarily required.

Figure 18:
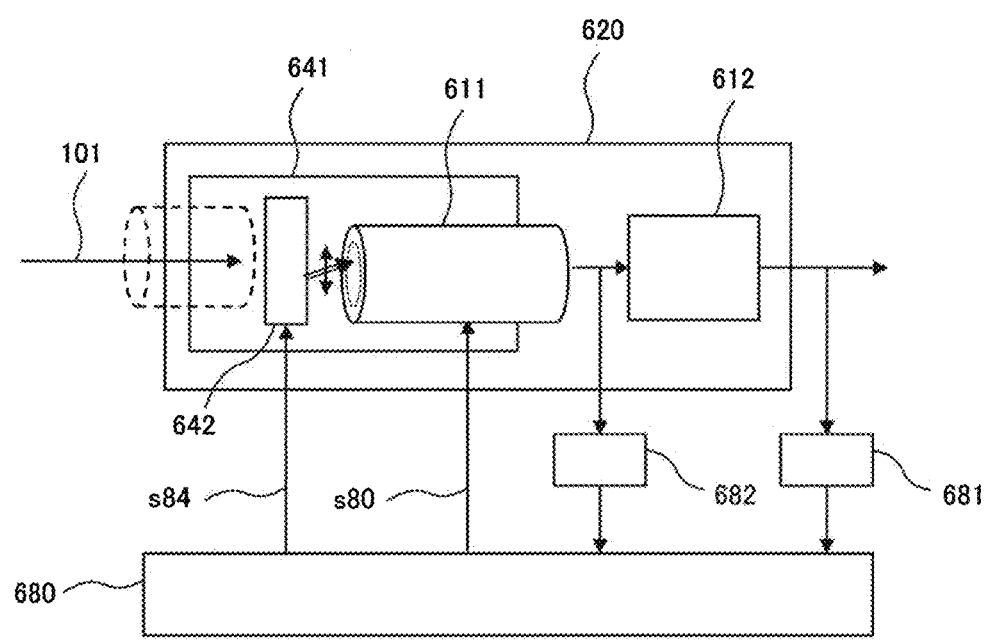
FIG. 18 is a block diagram illustrating yet another specific configuration example of a mode conversion unit included in a free space optical receiver in accordance with the sixth example embodiment of the present invention.

FIG. 18 illustrates yet another concrete configuration example of the beam scanner. A beam scanner 641 includes an acousto-optic scanner 642 as a mechanism for varying the emitting direction of a beam. The acousto-optic scanner (AOS) is an element that generates a diffraction grating in an acousto-optic medium using ultrasonic waves and varies the traveling direction of the light propagating through the medium. The principle of the mode conversion using the acousto-optic scanner 642 and the variable control method of the beam scanner are similar to those using the above-mentioned piezoelectric element 622 or spatial modulator 632.

The mode control unit 680 controls the acousto-optic scanner 642 based on the monitoring results of a mode distribution mode-separated in a following stage or signal quality information that is detected by the signal processing unit 160. At this time, the mode control unit 680 may perform the mode estimation process described using FIG. 12.

A Seventh Example Embodiment

Figure 19:
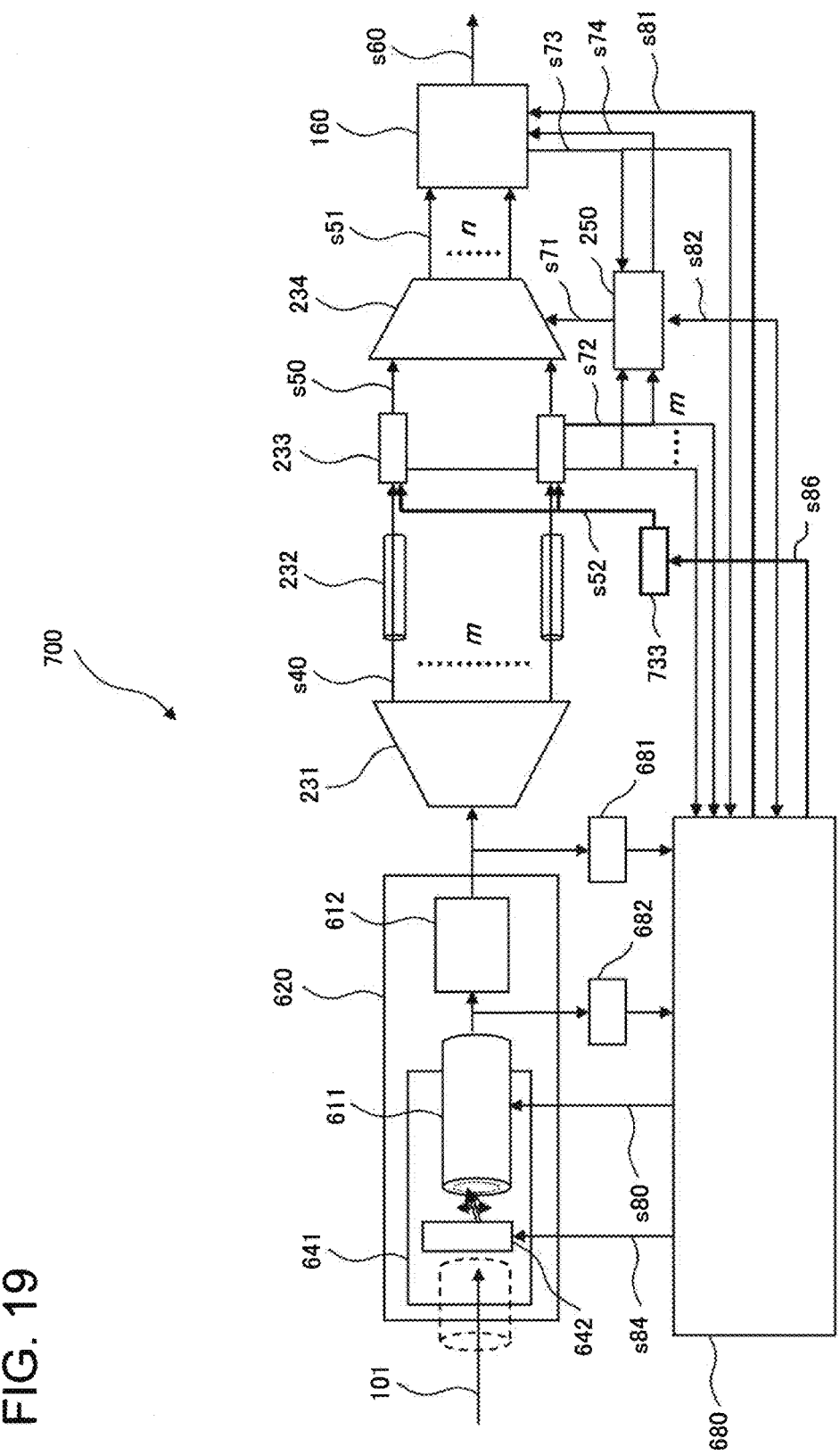
FIG. 19 is a block diagram illustrating a configuration of a free space optical receiver in accordance with a seventh example embodiment of the present invention.

Next, a seventh example embodiment of the present invention will be described. FIG. 19 illustrates a configuration of a free space optical receiver 700 in accordance with the seventh example embodiment of the present invention. The free space optical receiver 700 according to the present example embodiment is configured in which the mode conversion unit 620 includes the acousto-optic scanner 642 according to the sixth example embodiment. The optical receiver 233 is a coherent optical receiver including a local oscillation optical source 733.

The acousto-optic scanner (AOS), by ultrasonic waves to generate a diffraction grating in a medium, generates a frequency shift corresponding to the frequency of the ultrasonic waves in passing signal light. The frequency of the ultrasonic waves applied to the medium can range from several megahertz (MHz) to several hundred megahertz (MHz); consequently, a frequency shift corresponding to this is induced in the signal light.

At this time, if the coherent optical receiving technology is used for the optical receiver 233, a frequency error with local oscillation light from the local oscillation optical source 733 becomes a major problem. That is to say, when a frequency difference between the signal light and the local oscillation light suddenly varies, there is the potential for large deterioration to arise in a symbol error rate of received signals.

As illustrated in FIG. 19, the free space optical receiver 700 according to the present example embodiment is configured in which the mode control unit 680 supplies frequency offset information s86 to the local oscillation optical source 733. As a result, it is possible to compensate for a frequency shift due to the acousto-optic scanner (AOS) by making the frequency of the local oscillation optical source 733 offset.

Because the frequency of the ultrasonic waves generated by the acousto-optic scanner (AOS) is determined depending on a mode conversion control signal s84, it is an amount known in principle to the mode control unit 680. Consequently, the mode control unit 680 can uniquely determine a frequency offset of the signal due to the generated ultrasonic waves. The mode control unit 680 generates a frequency offset signal s86 corresponding to the mode conversion control signal s84 using a predetermined relation. The local oscillation optical source 733 adjusts the oscillation frequency using a predetermined relation with reference to the frequency offset signal s86. These predetermined relations can be defined using a conversion equation or a reference table.

Next, the effect of the free space optical receiver 700 using the acousto-optic scanner 642 according to the present example embodiment will be described.

Examples of the application applying the free space optics (FSO) include communications from an artificial satellite to the ground. Since the artificial satellite moves at a high speed, it is known that the frequency of signal light is shifted due to a Doppler shift. This requires controlling synchronously the frequency of the local oscillation optical source, and there is a technology for stabilizing the frequency of local oscillation light by setting a time constant at a long time in a feedback control, for example.

However, because the scintillation caused by atmospheric disturbance randomly varies at high velocities, it is also necessary to randomly vary the frequency of a local oscillation optical source at high velocities. Because the frequency shift that the received signal light undergoes by the acousto-optic scanner (AOS) is determined by the frequency of a microwave to be applied to the acousto-optic scanner (AOS), it is possible to perform a feedforward actively to the local oscillation optical source 733. The feedforward makes it possible to perform a control following a high speed frequency variation and compensate for a frequency shift due to the acousto-optic scanner (AOS).

As described above, according to the free space optical receiver 700 in which the acousto-optic scanner (AOS) frequency shift compensation technology is applied to the free space optics (FSO) receiver, it is possible to compensate for the sudden deterioration of a symbol error rate occurring in a coherent optical receiver linked to the scintillation. As a result, it becomes possible to achieve a stable reception in the free space optics (FSO).

A frequency offset of signal light due to the acousto-optic scanner 642 may also be compensated for by the signal processing in a DSP using the digital coherent receiving technology.

It is possible in the digital coherent receiving technology to compensate for a frequency error between signal light and local oscillation light in the process of signal processing. In the frequency synchronization technology of the signal light and the local oscillation light, a frequency difference is compensated for by estimating a variation in the frequency difference. However, because a frequency shift due to the acousto-optic scanner (AOS) moves fast and randomly, there is a possibility that frequency error estimation by a DSP will become unstable.

However, the free space optical receiver 700 according to the present example embodiment is configured in which the mode control unit 680 notifies the signal processing unit 160 of the information on the frequency shift arising due to the acousto-optic scanner (AOS) through the same path as that of the mode switching information s81. The information on the frequency shift can include the direction and size of the shift, for example. It becomes possible to achieve the stable reception in the free space optics (FSO) by compensating for the frequency offset with feedforward control based on the frequency shift information that the signal processing unit 160 has received.

The frequency shift due to the acousto-optic scanner (AOS) generates the signal light with a plurality of frequencies having undergone a shift amount different from each other corresponding to a diffraction order of the acousto-optic scanner (AOS). Because the signal light beams corresponding to a plurality of diffraction orders are emitted from the acousto-optic scanner (AOS) at different angles, different modes are excited in the variable mode scrambler 611 in a following stage, and the modes are separated by the mode separating unit 231.

At this time, different frequency offsets arise in the signal light converted into different modes for the identical signal light inputted. That is to say, there is a correspondence relation between a mode and an offset amount. The correspondence relation can be predetermined or determined by learning the correspondence relation using a training sequence and the like. This makes it possible to achieve high-quality signal receiving by switching, dynamically for each mode, a control of a frequency offset that is performed by an internal process of the DSP.

More specifically, the mode control unit 680 supplies the signal processing unit 160 through the same path as that of mode switching information s81 with the information on the frequency offset of signal light generated in the acousto-optic scanner 642. The signal processing unit 160 searches for an optimum frequency offset for received signals corresponding to respective modes, using a frequency difference that is equal to the integral multiple of a frequency offset amount within a predetermined range as a candidate of an offset amount. The frequency difference of the integral multiple corresponds to a diffraction order of the acousto-optic scanner (AOS).

According to the free space optical receiver 700 of the present example embodiment, the signal processing unit 160 can obtain a timing of the variation in a signal light frequency shift linked to the switching of the mode conversion and candidates of the frequency shift amount. This makes it possible to reduce a computation load required for estimating a frequency difference in the signal processing unit 160.

The above-mentioned configuration of the free space optical receiver 700 according to the present example embodiment can be applied to a coherent optical receiver based on the differential phase shift keying (DPSK) without using the local oscillation optical source 733. There is a possibility in the configuration that receiving characteristics will deteriorate due to a phase difference offset while the frequency of the signal light transits due to the acousto-optic scanner (AOS). In contrast, in the free space optical receiver 700 according to the present example embodiment, as with the above-mentioned case, a frequency offset arising in the acousto-optic scanner 642 has been already known. Consequently, it is possible to compensate for the offset; therefore, it becomes possible to avoid the deterioration of the receiving characteristics.

The present invention has been described by employing the above-mentioned example embodiments as exemplary examples. However, the present invention is not limited to the above-mentioned example embodiments. That is to say, the present invention can employ various aspects that can be understood by a person skilled in the art within the scope thereof.

This application is based upon and claims the benefit of priority from Japanese patent application No. 2014-148668, filed on Jul. 22, 2014, the disclosure of which is incorporated herein in its entirety by reference.

The whole or part of the example embodiments disclosed above can be described as, but not limited to, the following supplementary notes.

(Supplementary note 1) A free space optical receiver comprises a light collecting unit for collecting laser light having propagated through a free space transmission path; a multi-mode transmission medium for receiving input of the laser light and outputting multi-mode light; a multi-mode signal processing unit for outputting a plurality of received electrical signals based on part of the multi-mode light; a monitor unit for monitoring signal information based on the multi-mode light; a control unit for controlling an operation of the multi-mode signal processing unit based on the signal information; and a signal processing unit for performing signal processing on the plurality of received electrical signals and outputting an output signal synthesized from the plurality of received electrical signals.

(Supplementary note 2) The free space optical receiver according to the Supplementary note 1, wherein the multi-mode signal processing unit outputs a plurality of received electrical signals based on lower order mode light included in the multi-mode light.

(Supplementary note 3) The free space optical receiver according to Supplementary note 1 or 2, wherein the multi-mode signal processing unit includes a mode separating unit for separating the multi-mode light beam into a plurality of single-mode light beams, a plurality of single-mode transmission media for propagating the plurality of single-mode light beams respectively, a plurality of optical receiving units for respectively receiving the plurality of single-mode light beams through the plurality of single-mode transmission media and demodulating the plurality of single-mode light beams, and a signal selecting unit, disposed in at least one of a stage preceding and a stage following the plurality of optical receiving units, for selecting and outputting a part of a plurality of input signals, wherein the control unit controls an operation of the signal selecting unit based on at least one of signal information on the plurality of single-mode light beams and quality information on the received electrical signals calculated by the signal processing unit.

(Supplementary note 4) The free space optical receiver according to the Supplementary note 3, further comprises a combining unit, wherein the signal processing unit includes a plurality of signal processing circuits, and the combining unit combines outputs of the plurality of signal processing circuits and outputs the output signal.

(Supplementary note 5) The free space optical receiver according to Supplementary note 1 or 2, wherein the multi-mode signal processing unit includes a mode conversion unit for converting an optical energy distribution of the multi-mode light and generates a plurality of propagation mode light beams in which optical energy concentrates, a mode separating unit for separating the plurality of propagation mode light beams and outputting each light beam, a plurality of single-mode transmission media for guiding the plurality of propagation mode light beams respectively, and a plurality of optical receiving units for receiving the plurality of propagation mode light beams through the plurality of single-mode transmission media and demodulating signals included in the plurality of propagation mode light beams, respectively, wherein the control unit controls an operation of the mode conversion unit based on at least one of signal information on the plurality of propagation mode light beams and quality information on the received electrical signals calculated by the signal processing unit.

(Supplementary note 6) The free space optical receiver according to the Supplementary note 5, wherein the mode conversion unit includes a mode scrambler, the mode scrambler includes a multi-mode transmission medium and an actuating unit for controlling a mode excited in the multi-mode transmission medium, and the control unit controls an operation of the actuating unit.

(Supplementary note 7) The free space optical receiver according to the Supplementary note 6, wherein the mode conversion unit includes a mode filter on an emitting side of the mode conversion unit.

(Supplementary note 8) The free space optical receiver according to any one of Supplementary notes 5, 6, and 7 wherein the multi-mode signal processing unit further includes a signal selecting unit, disposed in at least one of a stage preceding and a stage following the plurality of optical receiving unit, for selecting and outputting a part of a plurality of input signals, and the control unit controls an operation of the signal selecting unit based on at least one of signal information on the plurality of propagation mode light beams and quality information on the received electrical signals calculated by the signal processing unit.

(Supplementary note 9) A free space optical receiving method comprises collecting laser light having propagated through a free space transmission path; converting collected laser light into multi-mode light; monitoring signal information based on the multi-mode light; generating a plurality of received electrical signals based on part of the multimode light, based on the signal information; and synthesizing an output signal from the plurality of received electrical signals.

(Supplementary note 10) The free space optical receiving method according to Supplementary note 9, further comprises separating the multi-mode light beam into a plurality of single-mode light beams, and selecting a part of received signals based on the plurality of single-mode light, based on at least one of signal information on the plurality of single-mode light beams and quality information on the received electrical signals.

(Supplementary note 11) The free space optical receiver according to the Supplementary note 3, wherein the signal information includes at least one of a signal intensity, a signal amplitude, a noise intensity, and a noise amplitude.

(Supplementary note 12) The free space optical receiver according to the Supplementary note 3, wherein the quality information includes at least one of a signal amplitude, a noise amplitude, a Q value, a S/N ratio, phase information, polarized wave information, and a symbol error rate.

(Supplementary note 13) The free space optical receiver according to the Supplementary note 3, wherein the combining unit includes an input buffer circuit for phase matching of a resynthesized signal.

(Supplementary note 14) The free space optical receiver according to one of the Supplementary notes 3 and 4, wherein, when a mode is selected by controlling the signal selecting unit, the control unit uses at least one of a method for selecting received signals having a light intensity exceeding a predetermined threshold value, a method for selecting signals in an order in which a light intensity is large, a method for selecting signals in an order in which a mode order is small, a method for selecting signals on the basis of the Q value, a method for selecting signals on the basis of the phase information, a method for selecting signals on the basis of the polarized wave information, and a method for selecting signals on the basis of the symbol error rate.

(Supplementary note 15) The free space optical receiver according to one of the Supplementary notes 3 and 4, wherein the signal selecting unit includes a matrix switch based on an electronic circuit that selects and outputs n input from m input, m and n are positive integers, and a relation of m≥n≥1 is satisfied.

(Supplementary note 16) The free space optical receiver according to one of the Supplementary notes 3 and 4, wherein the control unit supplies selector switching information to the signal processing unit, thereby performing selection of reception modes and a resynthesis process of the received electrical signals in cooperation with each other.

(Supplementary note 17) The free space optical receiver according to one of the Supplementary notes 3 and 4, wherein the control unit includes a configuration of notifying the signal processing unit of blocking of the received electrical signals and additional information as the selector switching information, and performs optimization of at least one of a mask process and an error correction process of an internal error in the signal processing unit.

(Supplementary note 18) The free space optical receiver according to one of the Supplementary notes 3 and 4, wherein the signal selecting unit includes an optical matrix switch in which the number of input signals is m and the number of output signals is n.

(Supplementary note 19) The free space optical receiver according to the Supplementary note 4, wherein the plurality of signal processing circuits complementarily operate during a period in which a resynthesis process of received electrical signals based on a training operation of the signal processing circuits is stopped.

(Supplementary note 20) The free space optical receiver according to the Supplementary note 8, wherein the signal selecting unit selects a low order mode and a few modes.

(Supplementary note 21) The free space optical receiver according to any one of the Supplementary notes 5 to 8, wherein the mode control unit estimates a propagation mode, assumes the case in which a mode conversion state has been changed by using the estimated propagation mode, performs simulation of a mode intensity distribution after mode conversion on the basis of the assumption, compares the assumed mode conversion state with a current state, and performs convergence determination by a comparison of quality judgment.

(Supplementary note 22) The free space optical receiver according to the Supplementary note 6, wherein the mode scrambler can be coupled to all modes propagating through the multi-mode transmission medium.

(Supplementary note 23) The free space optical receiver according to the Supplementary note 7, wherein a mode divisible by the mode separating unit propagates through the mode filter.

(Supplementary note 24) The free space optical receiver according to the Supplementary note 7, wherein the mode filter is a multi-mode fiber having a core diameter smaller than that of the multi-mode fiber provided in the variable mode scrambler.

(Supplementary note 25) The free space optical receiver according to the Supplementary note 7, wherein the mode filter selectively spreads a high order mode.

(Supplementary note 26) The free space optical receiver according to the Supplementary note 7, wherein at least one of the variable mode scrambler, the mode filter, and the mode separating unit includes a three-dimensional optical waveguide device.

(Supplementary note 27) The free space optical receiver according to the Supplementary note 6, wherein the mode separating unit further includes a beam scanner at a preceding stage of the variable mode scrambler, and the control unit controls an operation of the beam scanner.

(Supplementary note 28) The free space optical receiver according to the Supplementary note 6, wherein the beam scanner includes any one of a piezoelectric element, a movable lens, and a mirror.

(Supplementary note 29) The free space optical receiver according to the Supplementary note 28, wherein the beam scanner includes an acousto-optic scanner.

(Supplementary note 30) The free space optical receiver according to the Supplementary note 28, wherein the beam scanner includes an acousto-optic scanner, the optical receiver is a coherent optical receiver provided with a local oscillation optical source, and the mode control unit supplies frequency offset information to the local oscillation optical source.

(Supplementary note 31) The free space optical receiver according to the Supplementary note 30, wherein the frequency offset information includes information on a frequency shift due to the acousto-optic scanner.

(Supplementary note 32) The free space optical receiver according to the Supplementary note 27, wherein the beam scanner includes an acousto-optic scanner, the optical receiver is a coherent optical receiver provided with a local oscillation optical source, the mode control unit notifies the signal processing unit of information on a frequency shift generated by the acousto-optic scanner, and the signal processing unit compensates for the frequency offset on the basis of the received information on the frequency shift.

REFERENCE SIGNS LIST 100, 200, 201, 300, 301, 302, 400, 500, 600, 700 free space optical receiver
101 laser light
110 light collecting unit
120 multi-mode transmission medium
121 core
130 multi-mode signal processing unit
140 monitor unit
150 control unit
160 signal processing unit
231 mode separating unit
232 single-mode transmission media
233 optical receiver
234 signal selecting unit
250 selection control unit
361 first signal processing circuit
362 second signal processing circuit
363, 364 signal processing circuit (DSP)
370 combining unit
410, 610, 620 mode conversion unit
480, 680 mode control unit
611 variable mode scrambler
612 mode filter
621, 631, 641 beam scanner
622 piezoelectric element
632 spatial modulator
642 acousto-optic scanner
681, 682 monitor means
733 local oscillation optical source

The invention claimed is:

1. A free space optical receiver, comprising:
a light collecting unit configured to collect laser light having propagated through a free space transmission path;
a multi-mode transmission medium for receiving input of the laser light and outputting multi-mode light;
a multi-mode signal processing unit configured to output a plurality of received electrical signals based on part of the multi-mode light;
a monitor configured to monitor signal information based on the multi-mode light;
a controller configured to control an operation of the multi-mode signal processing unit based on the signal information; and
a signal processing unit configured to perform signal processing on the plurality of received electrical signals and output an output signal synthesized from the plurality of received electrical signals.

2. The free space optical receiver according to claim 1, wherein the multi-mode signal processing unit outputs a plurality of received electrical signals based on lower order mode light included in the multi-mode light.

3. The free space optical receiver according to claim 1, wherein the multi-mode signal processing unit includes
a mode separating unit configured to separate the multi-mode light beam into a plurality of single-mode light beams,
a plurality of single-mode transmission media for propagating the plurality of single-mode light beams respectively,
a plurality of optical receiving units configured to respectively receive the plurality of single-mode light beams through the plurality of single-mode waveguides transmission media and demodulate the plurality of single-mode light beams, and
a signal selecting unit disposed in at least one of a stage preceding and a stage following the plurality of optical receivers receiving units, configured to select and output a part of a plurality of input signals,
wherein the controller controls an operation of the signal selecting unit based on at least one of signal information on the plurality of single-mode light beams and quality information on the received electrical signals calculated by the signal, processing unit.

4. The free space optical receiver according to claim 3, further comprising a combining unit,
wherein the signal processing unit includes a plurality of signal processing circuits, and
the combining unit combines outputs of the plurality of signal processing circuits and outputs the output signal.

5. The free space optical receiver according to claim 1, wherein the multi-mode signal processing unit includes
a mode conversion unit configured to convert an optical energy distribution of the multi-mode light and generate a plurality of propagation mode light beams in which optical energy concentrates,
a mode separating unit configured to separate the plurality of propagation mode light beams and output each light beam,
a plurality of single-mode transmission media for guiding the plurality of propagation mode light beams respectively, and
a plurality of optical receiving units configured to receive the plurality of propagation mode light beams through the plurality of single-mode transmission media and demodulate signals included in the plurality of propagation mode light beams, respectively, wherein the controller controls an operation of the mode conversion unit based on at least one of signal information on the plurality of propagation mode light beams and quality information on the received electrical signals calculated by the signal processing unit.

6. The free space optical receiver according to claim 5, wherein the mode conversion unit includes a mode scrambler, the mode scrambler includes a multi-mode transmission medium and an actuating unit configured to control a mode excited in the multi-mode transmission medium, and
the controller controls an operation of the actuating unit.

7. The free space optical receiver according to claim 6, wherein the mode conversion unit includes a mode filter on an emitting side of the mode conversion unit.

8. The free space optical receiver according to claim 5, wherein the multi-mode signal processing unit further includes a signal selecting unit, disposed in at least one of a stage preceding and a stage following the plurality of optical receiving units, configured to select and output a part of a plurality of input signals, and
the controller controls an operation of the signal selecting unit based on at least one of signal information on the plurality of propagation mode light beams and quality information on the received electrical signals calculated by the signal processing unit.

9. The free space optical receiver according to claim 2, wherein the multi-mode signal processing unit includes
a mode separating unit configured to separate the multi-mode light beam into a plurality of single-mode light beams, a plurality of single-mode transmission media for propagating the plurality of single-mode light beams respectively, a plurality of optical receiving units configured to respectively receive the plurality of single-mode light beams through the plurality of single-mode waveguides transmission media and demodulate the plurality of single-mode light beams, and a signal selecting unit disposed in at least one of a stage preceding and a stage following the plurality of optical receiving units, configured to select and output a part of a plurality of input signals, wherein the controller controls an operation of the signal selecting unit based on at least one of signal information on the plurality of single-mode light beams and quality information on the received electrical signals calculated by the signal, processing unit.

10. The free space optical receiver according to claim 2, wherein the multi-mode signal processing unit includes a mode conversion unit configured to convert an optical energy distribution of the multi-mode light and generate a plurality of propagation mode light beams in which optical energy concentrates, a mode separating unit configured to separate the plurality of propagation mode light beams and output each light beam, a plurality of single-mode transmission media for guiding the plurality of propagation mode light beams respectively, and a plurality of optical receiving units configured to receive the plurality of propagation mode light beams through the plurality of single-mode transmission media and demodulate signals included in the plurality of propagation mode light beams, respectively, wherein the controller controls an operation of the mode conversion unit based on at least one of signal information on the plurality of propagation mode light beams and quality information on the received electrical signals calculated by the signal, processing unit.

11. The free space optical receiver according to claim 6, wherein the multi-mode signal processing unit further includes a signal selecting unit, disposed in at least one of a stage preceding and a stage following the plurality of optical receiving units, configured to select and output a part of a plurality of input signals, and the controller controls an operation of the signal selecting unit based on at least one of signal information on the plurality of propagation mode light beams and quality information on the received electrical signals calculated by the signal, processing unit.

12. The free space optical receiver according to claim 7, wherein the multi-mode signal processing unit further includes a signal selecting unit, disposed in at least one of a stage preceding and a stage following the plurality of optical receiving units, configured to select and output a part of a plurality of input signals, and the controller controls an operation of the signal selecting unit based on at least one of signal information on the plurality of propagation mode light beams and quality information on the received electrical signals calculated by the signal, processing unit.

* * * * *